United States Patent
Watanabe et al.

(10) Patent No.: US 10,398,273 B2
(45) Date of Patent: Sep. 3, 2019

(54) VACUUM CLEANER

(71) Applicant: TOSHIBA LIFESTYLE PRODUCTS & SERVICES CORPORATION, Kawasaki-shi (JP)

(72) Inventors: Koichi Watanabe, Shinagawa (JP); Takashi Tomiyama, Shinagawa (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 214 days.

(21) Appl. No.: 15/503,736

(22) PCT Filed: Aug. 17, 2015

(86) PCT No.: PCT/JP2015/073034
§ 371 (c)(1),
(2) Date: Feb. 14, 2017

(87) PCT Pub. No.: WO2016/027772
PCT Pub. Date: Feb. 25, 2016

(65) Prior Publication Data
US 2017/0273531 A1 Sep. 28, 2017

(30) Foreign Application Priority Data
Aug. 20, 2014 (JP) .................................. 2014-167916

(51) Int. Cl.
*A47L 9/00* (2006.01)
*A47L 9/28* (2006.01)
(Continued)

(52) U.S. Cl.
CPC ............... *A47L 9/2852* (2013.01); *A47L 5/22* (2013.01); *A47L 9/009* (2013.01); *A47L 9/0411* (2013.01);
(Continued)

(58) Field of Classification Search
USPC ............................... 701/23–28; 700/245–264
See application file for complete search history.

(56) References Cited

U.S. PATENT DOCUMENTS 4,674,048 A * 6/1987 Okumura ............... B25J 9/1676
318/568.12
6,459,955 B1 * 10/2002 Bartsch .................... A47L 9/00
700/245
(Continued)

FOREIGN PATENT DOCUMENTS

CN 103315683 A 9/2013
CN 103491841 A 1/2014
(Continued)

OTHER PUBLICATIONS

International Search Report dated Nov. 2, 2015 in PCT/JP2015/073034 filed Aug. 17, 2015.

*Primary Examiner* — Jonathan L Sample
(74) *Attorney, Agent, or Firm* — Oblon, McClelland, Maier & Neustadt, L.L.P.

(57) ABSTRACT

A vacuum cleaner capable of more efficiently cleaning narrow spots while effectively avoiding an object. An object sensor provided in a main casing detects the presence or absence of an object within a specified distance in a plurality of directions on a forward side of the main casing. A control unit controls operation of driving wheels, based on detection of an object by the object sensor to thereby make the main casing autonomously travel. When an object is detected by the object sensor, the control unit controls the operation of the driving wheels, so that the main casing is swung to an angle corresponding to a direction of the detected object to thereby make a side portion of the main casing face the object.

6 Claims, 15 Drawing Sheets

(51) Int. Cl.
*A47L 5/22* (2006.01)
*A47L 9/04* (2006.01)
*G05D 1/00* (2006.01)
*G05D 1/02* (2006.01)

(52) U.S. Cl.
CPC .......... *A47L 9/0477* (2013.01); *A47L 9/0488* (2013.01); *A47L 9/28* (2013.01); *A47L 9/2826* (2013.01); *A47L 9/2873* (2013.01); *A47L 9/2884* (2013.01); *A47L 9/2894* (2013.01); *G05D 1/0088* (2013.01); *G05D 1/0242* (2013.01); *G05D 1/0255* (2013.01); *A47L 2201/022* (2013.01); *A47L 2201/04* (2013.01)

(56) References Cited

U.S. PATENT DOCUMENTS

| | | | | |
|---|---|---|---|---|
| 6,594,844 | B2* | 7/2003 | Jones | G05D 1/0238 15/319 |
| 8,396,592 | B2* | 3/2013 | Jones | A47L 11/00 318/568.12 |
| 8,930,023 | B2* | 1/2015 | Gutmann | G05D 1/0234 700/245 |
| 9,436,185 | B2* | 9/2016 | Schnittman | G05D 1/0227 |
| 2002/0193908 | A1* | 12/2002 | Parker | G06N 3/008 700/258 |
| 2003/0025472 | A1* | 2/2003 | Jones | G05D 1/0219 318/568.12 |
| 2003/0028993 | A1* | 2/2003 | Song | A47L 9/009 15/319 |
| 2005/0156562 | A1* | 7/2005 | Cohen | A47L 9/2857 320/107 |
| 2005/0235451 | A1* | 10/2005 | Yan | A47L 9/009 15/319 |
| 2005/0251292 | A1* | 11/2005 | Casey | G05D 1/0238 700/245 |
| 2006/0010638 | A1* | 1/2006 | Shimizu | A47L 9/009 15/319 |
| 2006/0085105 | A1* | 4/2006 | Chiu | H02J 7/0044 701/23 |
| 2006/0190133 | A1* | 8/2006 | Konandreas | A22C 17/0013 700/245 |
| 2006/0190146 | A1* | 8/2006 | Morse | A47L 5/14 701/23 |
| 2007/0016328 | A1* | 1/2007 | Ziegler | A47L 5/14 700/245 |
| 2007/0179670 | A1* | 8/2007 | Chiappetta | G05D 1/0272 700/245 |
| 2007/0192910 | A1* | 8/2007 | Vu | B25J 5/007 700/245 |
| 2007/0213892 | A1* | 9/2007 | Jones | A47L 11/00 701/23 |
| 2007/0285041 | A1* | 12/2007 | Jones | G05D 1/0219 318/568.12 |
| 2008/0007193 | A1* | 1/2008 | Jones | G05D 1/0219 318/568.12 |
| 2008/0015738 | A1* | 1/2008 | Casey | G05D 1/0238 700/258 |
| 2008/0161969 | A1* | 7/2008 | Lee | G05D 1/0225 700/245 |
| 2008/0184518 | A1* | 8/2008 | Taylor | A47L 9/009 15/319 |
| 2008/0276407 | A1* | 11/2008 | Schnittman | A47L 11/34 15/319 |
| 2009/0292393 | A1* | 11/2009 | Casey | G05D 1/0238 700/245 |
| 2012/0169497 | A1* | 7/2012 | Schnittman | A47L 9/106 340/540 |
| 2012/0173070 | A1* | 7/2012 | Schnittman | G05D 1/0227 701/26 |
| 2012/0232696 | A1* | 9/2012 | Tang | A47L 9/009 700/258 |
| 2013/0000675 | A1* | 1/2013 | Hong | A47L 9/009 134/18 |
| 2013/0030750 | A1* | 1/2013 | Kim | G06N 3/004 702/108 |
| 2013/0118528 | A1* | 5/2013 | Kim | G05D 1/0219 134/18 |
| 2013/0221917 | A1* | 8/2013 | Kulkarni | B60L 53/31 320/109 |
| 2013/0226344 | A1* | 8/2013 | Wong | G05D 1/024 700/258 |
| 2014/0088761 | A1* | 3/2014 | Shamlian | G05D 1/0238 700/253 |
| 2014/0100736 | A1* | 4/2014 | Kim | G05D 1/0219 701/26 |
| 2014/0257565 | A1* | 9/2014 | Sun | B25J 9/1694 700/259 |
| 2014/0283326 | A1* | 9/2014 | Song | A47L 11/4041 15/319 |
| 2015/0197012 | A1* | 7/2015 | Schnittman | G05D 1/0227 700/250 |
| 2016/0334791 | A1 | 11/2016 | Schnittman | |

FOREIGN PATENT DOCUMENTS

| | | |
|---|---|---|
| EP | 2 738 637 A2 | 6/2014 |
| JP | 2006-26028 A | 2/2006 |
| JP | 2007-330567 A | 12/2007 |
| JP | 2013-223650 A | 10/2013 |
| JP | 2013-223734 A | 10/2013 |
| JP | 2014-501426 A | 1/2014 |
| WO | WO 02/101477 A2 | 12/2002 |
| WO | 2012/099694 A1 | 7/2012 |

* cited by examiner

VACUUM CLEANER

TECHNICAL FIELD

Embodiments described herein relate generally to a vacuum cleaner which autonomously travels due to control of operation of its driving wheels based on detection of objects by an object detection means.

BACKGROUND ART

Conventionally, there is known a so-called autonomous-traveling type vacuum cleaner (cleaning robot) which autonomously travels on and cleans a cleaning-object surface while detecting an obstacle or the like by using, for example, a sensor or the like.

Generally, since various obstacles of different shapes or placements are present on the cleaning-object surface, it is desirable that the cleaning-object surface can be cleaned without gaps as much as possible while those obstacles are effectively avoided. However, sensors mounted on such vacuum cleaners are ordinarily infrared sensors, ultrasonic sensors and the like and so it is not easy to directly discriminate an obstacle by a sensor.

Accordingly, it is conceivable that, for example, by scanning an obstacle with a sensor while swinging the vacuum cleaner, a shape of the obstacle is discriminated and a type of the obstacle is inferred. However, this action results in an unnecessary action as a cleaning action and moreover entering narrow spots surrounded by obstacles or escaping from narrow spots involves such scanning every time, leading to worse efficiency.

Consequently, efficient cleaning of narrow spots to be enabled while obstacles are effectively avoided is desired.

CITATION LIST

Patent Literature

PTL 1: Japanese Laid-open Patent Publication No. 2014-501426

SUMMARY OF INVENTION

Technical Problem

An object of the invention is to provide a vacuum cleaner capable of more efficiently cleaning narrow spots while effectively avoiding objects.

Solution to Problem

The vacuum cleaner according to the embodiments includes a main casing, driving wheels, a cleaning unit, an object sensor, and a control unit. The driving wheels enable the main casing to travel on a cleaning-object surface. The cleaning unit cleans the cleaning-object surface. The object sensor is provided in the main casing and detects the presence or absence of an object within a specified distance in a plurality of directions on a forward side of the main casing. The control unit controls operation of the driving wheels based on detection of an object by the object sensor to thereby make the main casing autonomously travel. When an object is detected by the object sensor, the control unit controls the operation of the driving wheels so that the main casing is swung to an angle corresponding to a direction of the detected object to thereby make a side portion of the main casing face the object.

DESCRIPTION OF EMBODIMENTS

Hereinbelow, an embodiment will be described in terms of its constitution with reference to the accompanying drawings.

In FIGS. 6 to 9, reference sign 11 denotes a vacuum cleaner as an autonomous traveler. This vacuum cleaner 11 is provided as a vacuum cleaner device serving as an autonomous traveling device together with, for example, a charging device (charging stand) as an unshown station device containing a charging circuit.

Figure 1:
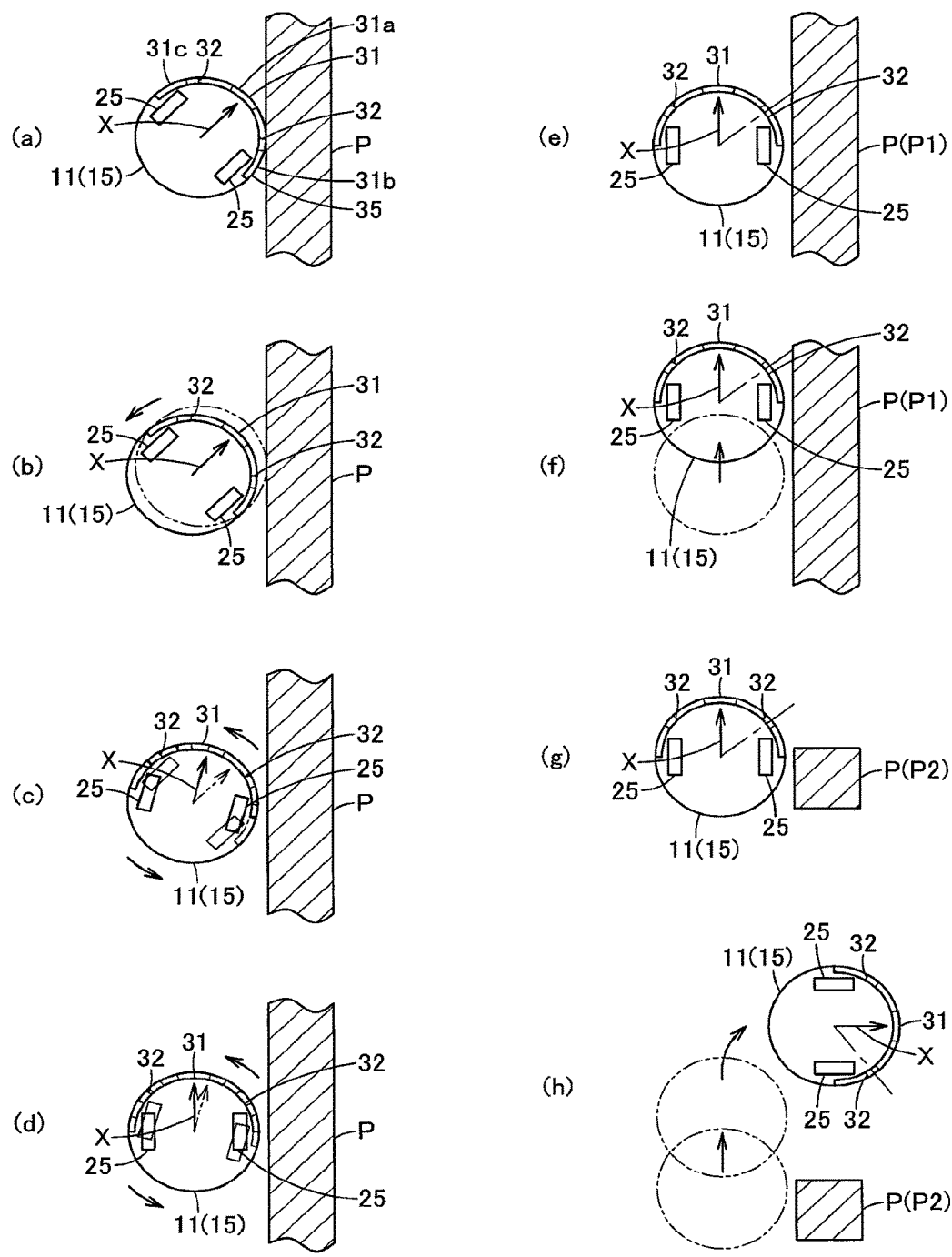
FIG. 1 is an explanatory view schematically showing, in an order of (a) to (h), an example of operation in a first traveling mode of a second cleaning-traveling mode of a vacuum cleaner in one embodiment.

The vacuum cleaner 11 is, in this embodiment, a so-called self-propelled robot cleaner (cleaning robot) that, while autonomously traveling (self-propelling) on a floor surface being a cleaning-object surface as a travel surface, cleans the floor surface. The vacuum cleaner 11 includes a hollow main casing 15, a traveling part 16 for making the main casing 15 travel on the floor surface, a cleaning unit 17 for cleaning dust and dirt on the floor surface and the like, a communication part 18 for communicating with an external device including a charging device, a display part 19 for displaying various types of information, a control unit 20 (controller) as a control means for controlling the traveling part 16, the cleaning unit 17, the communication part 18 and the display part 19, and a secondary battery 21 for supplying electric power to the traveling part 16, the cleaning unit 17, the communication part 18, the display part 19, the control unit 20 and the like. In addition, in the following description, a direction extending along the traveling direction of the vacuum cleaner 11 (main casing 15) is assumed as a back-and-forth direction (directions of arrows FR and RR shown in FIG. 6, etc.) while a left-and-right direction (directions toward both sides) crossing (orthogonally intersecting) with the back-and-forth direction is assumed as a widthwise direction. It is also assumed that a direction indicated by an arrow X shown in FIG. 1 and the like represents the forward side of the vacuum cleaner 11 (main casing 15).

The main casing 15 is formed from, for example, a synthetic resin into a flat cylindrical shape (disc shape) or the like. In its lower surface facing the floor surface, a suction port 22 and exhaust ports 23 are opened.

The traveling part 16 includes driving wheels 25, 25 as a plurality (pair) of driving parts, motors 26, 26 being a driving means (drive members) as operating parts for driving the driving wheels 25, 25, a swing wheel 27 for swinging use, a sensor part 28 having various types of sensors, and the like.

Each driving wheel 25 is intended for traveling use, i.e., for making the vacuum cleaner 11 (main casing 15) travel (autonomously travel) in advancing and retreating directions on the floor surface. The driving wheels 25, 25, having an unshown rotating shaft extending along a left-and-right widthwise direction, are placed widthwise symmetrical to each other.

Each motor 26 is placed in correspondence to each driving wheel 25, for example, so as to be able to drive each individual driving wheel 25 independently of each other.

The swing wheel 27 is a driven wheel which is placed at a generally widthwise central and frontal portion in the lower surface of the main casing 15 and which is swingable along the floor surface.

The sensor part 28 includes, for example, a rotational speed sensor 30 as a rotational speed detection means for detecting rotational speed of each driving wheel 25 (each motor 26), an object sensor 31 as an object detection means being a (first) obstacle detection means (obstacle sensor) for detecting the presence or absence of a physical object (obstacle) such as a wall and furniture within a specified distance forward of the main casing 15, and a detection sensor 32 as a detection means being a (second) obstacle detection means (obstacle sensor) for detecting the presence or absence of a physical object (obstacle) such as a wall and furniture within a specified distance forward of a side portion of the main casing 15. This sensor part 28 may further include, for example, an unshown step gap detection means (step gap sensor) such as an infrared sensor for detecting a step gap or the like of the floor surface, an unshown dust-and-dirt amount detection means (dust-and-dirt amount sensor) for detecting a dust-and-dirt amount on the floor surface, a station device detection means (station device sensor) such as a phototransistor for receiving radio signals (infrared signals) from a charging device and the like, an anti-collision signal detection means (anti-collision sensor) which is an obstacle detection means (obstacle sensor) as an object detection means (object sensor) such as an infrared sensor for detecting a radio signal (infrared signal) outputted from an external device such as a charging device or a region defining means (virtual guard) to thereby detect a virtual object (obstacle) formed around the external device or within its region by the received radio signal, and the like.

The rotational speed sensor 30 is an optical encoder and the like as an example. Based on measured rotational speeds of the driving wheels 25 (motors 26), the control unit 20 detects and monitors swing angle or advanced distance of the vacuum cleaner 11 (main casing 15). That is, the rotational speed sensor 30 has functions as both a swing angle detection means (swing angle sensor) and a distance detection means (distance sensor).

The object sensor 31, in this embodiment, is a contact sensor having a bumper 35 which is a circular-arc shaped, movable contactor forming a front-side half of the main casing 15, and a switch 36 which is to be actuated by movement of the bumper 35, thus the contact sensor detects contact between the bumper 35 and an object. That is, the object sensor 31 in this embodiment is configured to detect an object (located at a zero distance to) that comes into contact with the main casing 15.

The bumper 35, which is movable along a radial direction of the main casing 15, is biased in such a direction as to be protruded from the main casing 15 by an unshown biasing means (biaser) such as a spring, for example. In addition, the bumper 35 may also be formed into a semicircular-arc shape continuing from one side via a front portion to the other side of the main casing 15, or into circular-arc shapes resulting from plural division of a semicircular-arc region ranging from one side via a front portion to the other side of the main casing 15. In the case of such a plural-division configuration of the bumper 35, the bumpers 35 are preferably placed in left-and-right symmetry, for example, divided into three areas of a front portion and left-and-right both sides as an example.

The switch 36 is actuated, i.e. changed between an on and off state, by its contact with the bumper 35 that has relatively retreated by its contact with an object, the switch 36 being placed at least on both sides of the main casing 15, opposite to each other, at back face-sides of the bumper 35. Then, by being changed between on/off states in any one of these switches 36, it is made possible to detect a contact of the bumper 35 with an object as well as its contact position (contact direction). In this embodiment, a plurality of regions are set for the object sensor 31; for example, it can be detected which region of the main casing 15 (bumper 35) has come into contact with an object, out of several front-side, left/right-generally-equal specified angular ranges of the main casing 15 (bumper 35) including a left/right direction central position, exemplified by such three ranges as a front-side region 31a ranging over an extent of 15° each for left and right, i.e. ranging over a left-and-right total extent of 30°; a right-side region 31b rightward neighboring the front-side region 31a and ranging over a right-side specified angular range of e.g. 75° from the right side portion of the main casing 15 (bumper 35); and a left-side region 31c leftward neighboring the front-side region 31a and ranging over a left-side specified angular range of, e.g. 75° from the left side portion of the main casing 15 (bumper 35). Therefore, the object sensor 31 is configured to detect the presence or absence of an object located within a specified distance of angular ranges in the forward-side plural (three) directions of the main casing 15, where object-detectable regions 31a, 31b, 31c are set in left-and-right symmetry in this embodiment.

The detection sensor 32 is a non-contact sensor, such as an ultrasonic sensor or infrared sensor, for example, for detecting an object located at a specified distance apart from the main casing 15, i.e., located forward of a side portion thereof. That is, this detection sensor 32 has a function of an object detection means (object sensor), i.e., a distance measuring means (distance measuring sensor). In this embodiment, the detection sensor 32 is located, for example, at central portions of the right-side region 31b and the left-side region 31c, respectively, of the object sensor 31, i.e., at positions inclined by an angle of 52.5° each in the left-and-right directions relative to the forward direction of the main casing 15. Therefore, the detection sensors 32 are placed in left-and-right symmetry.

The cleaning unit 17 includes an electric blower 37 positioned, for example, in the main casing 15 to suck in dust and dirt, a rotary brush 38 as a rotary cleaner rotatably attached to the suction port 22 to scrape up dust and dirt, as well as a brush motor 39 for rotary driving the rotary brush, side brushes 40 being auxiliary cleaning means (auxiliary cleaning units) as swinging cleaning units rotatably attached on both sides of a front side or other portions of the main casing 15 to scrape together dust and dirt as well as side brush motors 41 for driving the side brushes 40, a dust collecting unit 42 for accumulating dust and dirt, and the like. In addition, as for the electric blower 37, the rotary brush 38 as well as the brush motor 39, and the side brushes 40 as well as the side brush motors 41, it is only required that at least any one of these members be provided.

The communication part 18 includes a transmission part 46 being a transmission means such as an infrared-emitting element for transmitting radio signals (infrared signals) to an external device such as a charging device, for example. In addition, the communication part 18 may further include a wireless LAN device or the like for receiving and transmitting radio signals with an external device, for example, such as mobile terminals via access points, for example, or the like.

The display part 19, which is to display clock time or time duration or various types of information related to the vacuum cleaner 11 and the like, is placed at an upper portion of the main casing 15 as an example. In addition, the display part 19 may be provided as a touch panel or the like additionally having a function of an input operation means (input operating part) which allows a user to directly input various types of settings, for example.

The control unit 20 is a microcomputer including a CPU, a timer, a counter and the like as an example, having a cleaning mode for, while autonomously traveling, carrying out cleaning by the cleaning unit 17 based on detection results of the sensor part 28, a return mode for searching for the charging device and returning to the charging device, a charging mode for charging the secondary battery 21 via the charging device, and a standby mode applied during a standby state. Then, in the cleaning mode, a plurality, e.g. three, of cleaning-traveling modes, i.e. first cleaning-traveling mode to third cleaning-traveling mode, are set, where these cleaning-traveling modes are to be changed over at each specified time-duration. That is, each time one of these cleaning-traveling modes has been executed for a set specified time duration set in correspondence to a relevant one of the cleaning-traveling modes, the cleaning-traveling mode is switched over to the next cleaning-traveling mode. During the cleaning time, the process is repetitively performed in an order of, for example, the first cleaning-traveling mode, the second cleaning-traveling mode, the third cleaning-traveling mode, and the first cleaning-traveling mode.

Figure 10:
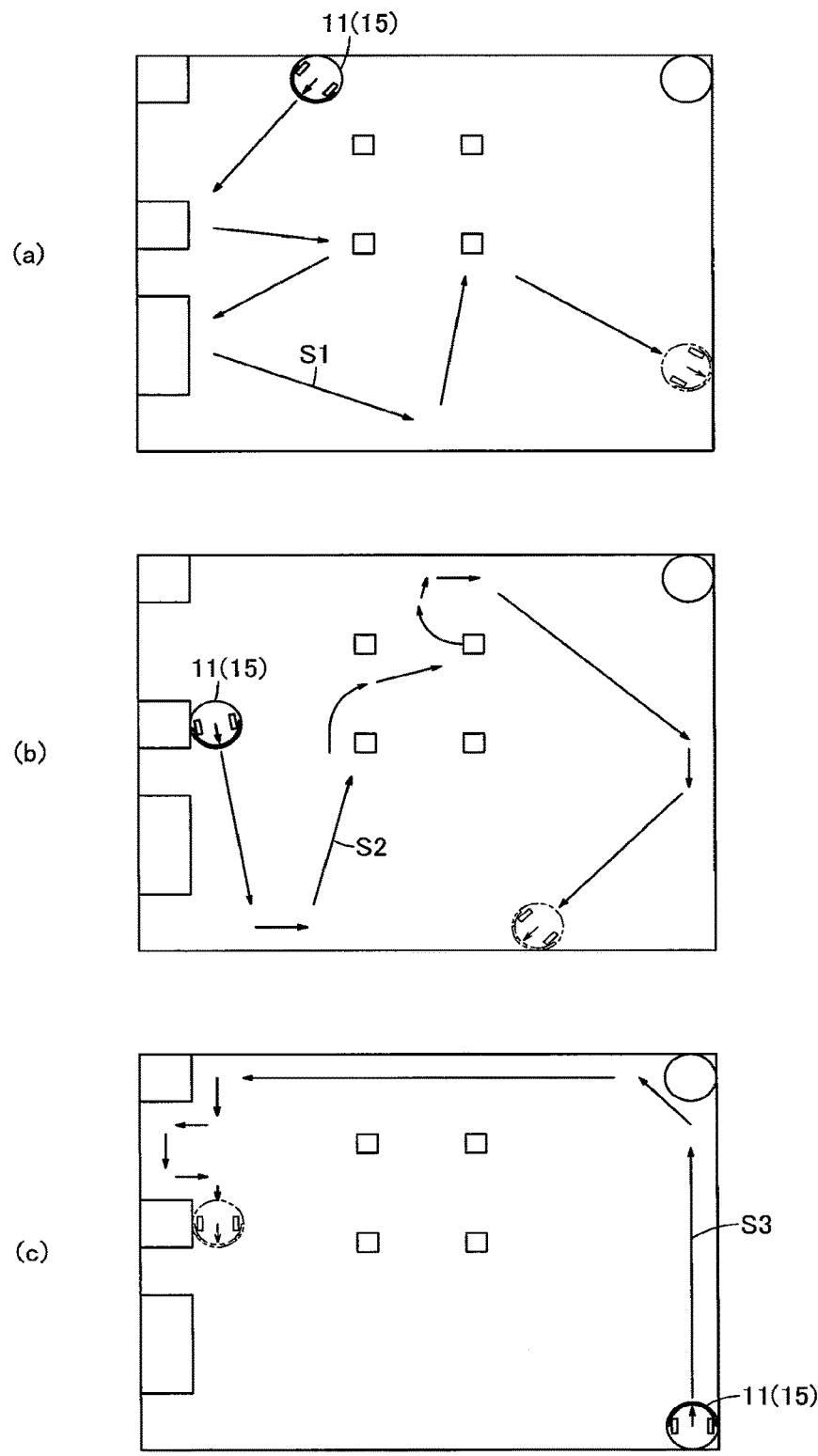
FIG. 10(a) is an explanatory view schematically showing an example of operation in the first cleaning-traveling mode of the vacuum cleaner.
FIG. 10(b) is an explanatory view schematically showing an example of operation in the second cleaning-traveling mode of the vacuum cleaner.
FIG. 10(c) is an explanatory view schematically showing an example of operation in a third cleaning-traveling mode of the vacuum cleaner.

The first cleaning-traveling mode is a mode for efficiently traveling in a region (open space) including few objects (obstacles), which could be called a random-bound traveling mode in which the vacuum cleaner 11 (main casing 15) goes straight in a room while turning its direction each time the vacuum cleaner has come to within a specified distance to (collided with) an object. In this first cleaning-traveling mode, not only the vacuum cleaner 11 (main casing 15) is made to go straight, but when a physical object (obstacle) P is detected within a specified distance by the object sensor 31 (contact with the vacuum cleaner 11 (main casing 15 (bumper 35)) is detected) or when an object (obstacle) P is detected within a specified distance by the detection sensors 32, operation of the motors 26, 26 (driving wheels 25, 25) is controlled so that, in the case of detection of contact, the vacuum cleaner 11 (main casing 15) is first slightly retreated to be separated from the object P and then swung by a specified swing angle (spin turn) so as to randomly change a traveling direction and made to further go straight (shown by an arrow S1 in FIG. 10(a)). Hereinbelow, the term 'go straight' refers to not only going ahead along a straight line, but also substantially going ahead, i.e., going ahead along a circular arc or the like approximate to a straight line.

The second cleaning-traveling mode is intended for effectively cleaning vicinities of obstacles such as a wall where dust and dirt are highly likely to accumulate, for example, or corners of a cleaning region or the like by the side brushes 40 (cleaning unit 17). The second cleaning-traveling mode includes a first traveling mode in which operation of the motors 26, 26 (driving wheels 25, 25) is controlled so that the vacuum cleaner 11 (main casing 15) is made to travel linearly (go straight) and moreover, when an object is detected by the object sensor or the detection sensors 32, the main casing 15 is swung to an angle corresponding to a direction of the detected object so as to make a side portion of the main casing 15 face the object, and a second traveling mode in which operation of the motors 26, 26 (driving wheels 25, 25) is controlled so that the main casing 15 travels in a curved shape along an object detected by the object sensor 31 or the detection sensors 32 (shown by an arrow S2 in FIG. 10(b)).

The first traveling mode is intended for making the vacuum cleaner 11 (main casing 15) enter, for example, around legs of furniture or the like where dust and dirt are highly likely to accumulate. In this mode, it is decided in a simplified manner whether or not an object detected by the object sensor 31 or the detection sensors 32 is a wall, where if the object is a wall, the vacuum cleaner 11 (main casing 15) travels linearly along the wall; if the object is not a wall, the vacuum cleaner 11 (main casing 15) goes on a round-about way around the object in a round-about mode. Also, the second traveling mode is a mode which could be called an escape-from-narrow-spot traveling mode for escaping from narrow spots or the like which the vacuum cleaner 11 (main casing 15) has entered by the first traveling mode.

The third cleaning-traveling mode is intended for effectively cleaning vicinities of obstacles such as a wall where dust and dirt are highly likely to accumulate or corners of a cleaning region or the like by the side brushes 40 (cleaning unit 17), for example. This third cleaning-traveling mode could be called an along-the-wall traveling mode in which the vacuum cleaner 11 (main casing 15) travels generally parallel to an outer edge of a region of an obstacle (wall) or the like, which is the object detected by the object sensor 31 or the detection sensors 32, while keeping a generally constant specified distance to the outer edge of the obstacle region. In this third cleaning-traveling mode, operation of the motors 26, 26 (driving wheels 25, 25) is controlled so that the vacuum cleaner 11 (main casing 15), while detecting a sideward obstacle (wall) by the detection sensors 32, travels generally linearly along the obstacle and moreover, when an object is detected by the object sensor 31 forward of the main casing 15, the main casing is swung to a specified angle (spin turn) at the detection position so as to be changed in direction to make a side portion of the vacuum cleaner 11 (main casing 15), i.e. a detection sensor 32, face the object and moreover make the vacuum cleaner 11 (main casing 15) travel linearly along the wall (shown by an arrow S3 in FIG. 10(c)). In this embodiment, it is assumed hereinbelow that the third cleaning-traveling mode is a so-called along-the-right-hand mode in which the vacuum cleaner 11 (main casing 15) travels while facing the wall on the right side, i.e., while the right side of the vacuum cleaner 11 (main casing 15) travels along the obstacle (wall) as an object. However, the operation may also be left/right reversed, i.e., set to an along-the-left-hand mode. Moreover, the along-the-right-hand mode and the along-the-left-hand mode of the third cleaning-traveling mode may be switched over based on specified conditions, for example, each time a specified time (e.g., 10 mins) has elapsed.

The secondary battery 21 is electrically connected to charging terminals 48, 48 as connecting parts exposed on both sides of a rear portion of the lower surface of the main casing 15 as an example. By these charging terminals 48, 48 being electrically and mechanically connected to charging terminals on the charging device side, the secondary battery 21 is charged via the charging device.

Next, operations of the above-described embodiment will be described.

Generally, the vacuum cleaner 11 performs, as roughly classified, cleaning work for carrying out cleaning and charging work for charging the secondary battery 21 with the charging device. Then, the cleaning work is made up of an undocking motion where the vacuum cleaner 11 is undocked from the charging device, a cleaning motion where cleaning is done by the cleaning unit 17 after the undocking motion, a search motion where search for the charging device is done after or during the cleaning motion, an approach motion where the vacuum cleaner 11 travels toward the charging device detected by the search motion, a docking motion where the vacuum cleaner 11 having approached the charging device is docked with the charging device, and the like.

(Cleaning Work)

First, an outline of the cleaning work is described. When the control unit 20 of the vacuum cleaner 11 connected to the charging device is switched over to the cleaning mode at a timing of cleaning start, the vacuum cleaner 11 is undocked from the charging device and then, with the cleaning-traveling mode switched over, travels on the floor surface while avoiding obstacles and simultaneously cleans up dust and dirt on the floor surface by the cleaning unit 17 to collect the dust and dirt. Then, when the cleaning has been executed for not less than a cleaning time calculated based on size and complexity of the region that is being cleaned, the vacuum cleaner 11 returns to the charging device and ends the cleaning work.

Figure 12:
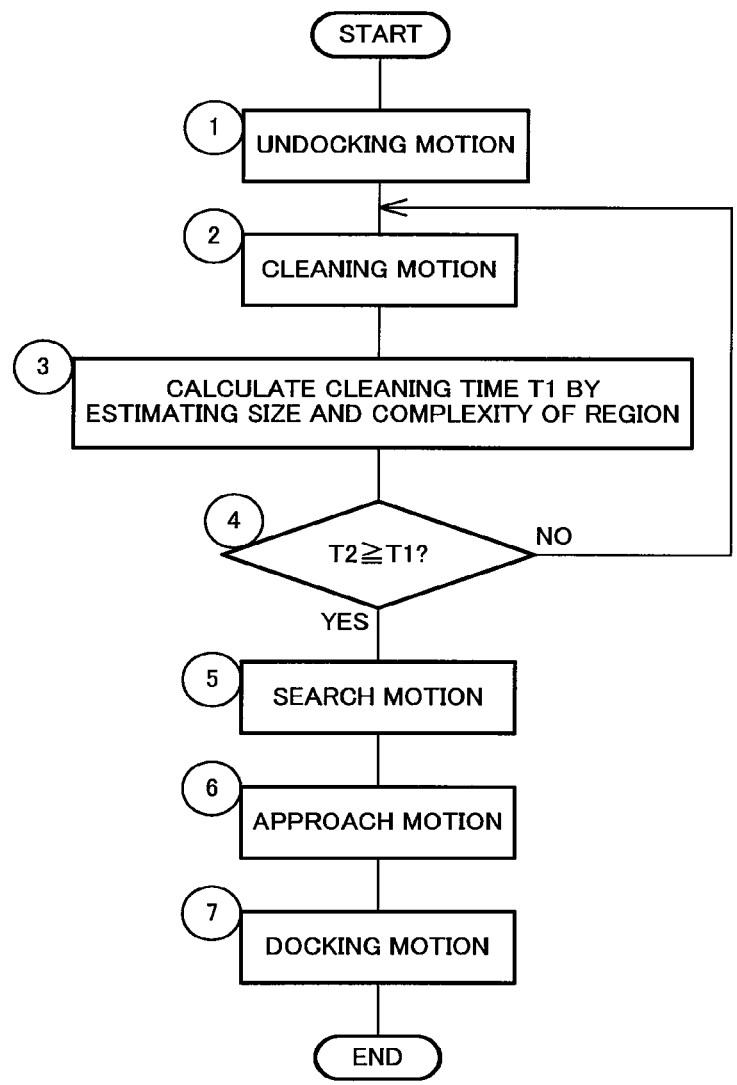
FIG. 12 is a flowchart showing an outline of cleaning operation processing of the vacuum cleaner.

In more detail, the cleaning work will be described with reference to the flowchart shown in FIG. 12. At a cleaning-start timing, such as an arrival at a preset cleaning start time, for example, the control unit 20 is switched over from standby mode to cleaning mode, driving the cleaning unit 17 and the traveling part 16 and the like, so that the vacuum cleaner 11 is undocked from the charging device, for example, in a linear motion (undocking motion (step 1)).

Next, the control unit 20 drives the driving wheels 25, 25 (motors 26, 26) in response to a detection by the sensor part 28 so that the vacuum cleaner 11 (main casing 15), with the individual cleaning-traveling modes switched over, is made to travel on the floor surface while avoiding objects (obstacles) and step gaps or the like to clean and collect dust and dirt on the floor surface with the cleaning unit 17 (cleaning motion (step 2)).

Further, during the cleaning motion, the control unit 20 estimates the size and complexity of the region that is being cleaned depending on moved distance of the vacuum cleaner 11 (main casing 15) or a dust-and-dirt amount as an example, and calculates a cleaning time T1 based on the estimated size and complexity of the region (step 3). Then, the control unit 20 decides whether or not a cleaning execution time T2 for which cleaning is executed has become equal to or more than the cleaning time T1 calculated in step 3 (step 4). If it is decided at this step 4 that the cleaning execution time T2 is less than the cleaning time T1, the process returns to step 2. Also, if it is decided at step 4 that the cleaning execution time T2 is not less than the cleaning time T1, the control unit 20 is switched over to the return mode and then drives the driving wheels 25, 25 (motors 26, 26) so that the vacuum cleaner 11 searches for the charging device while traveling (search motion (step 5)). In this search motion, the vacuum cleaner 11 detects whether or not a radio signal transmitted from a signal output means (signal output part) of the charging device is received by a reception means (reception part).

Then, the vacuum cleaner 11 (main casing 15) is made to travel so as to be directed toward the charging device detected by searching by the search motion. Thereafter, nearly at a specified distance to the charging device, with the charging terminals 48, 48 directed to the charging device, the vacuum cleaner 11 approaches the charging device linearly along the radio signal (calling-on signal) (approach motion (step 6)). Subsequently, the charging terminals 48, 48 are docked with the charging terminals (docking motion (step 7)). Then, after the docking of the vacuum cleaner 11 and the charging device is complete, the control unit 20 stops the cleaning unit 17 and the traveling part 16 or the like, ending the cleaning work.

The individual cleaning-traveling modes during the above-described cleaning motion will be described.

Figure 13:
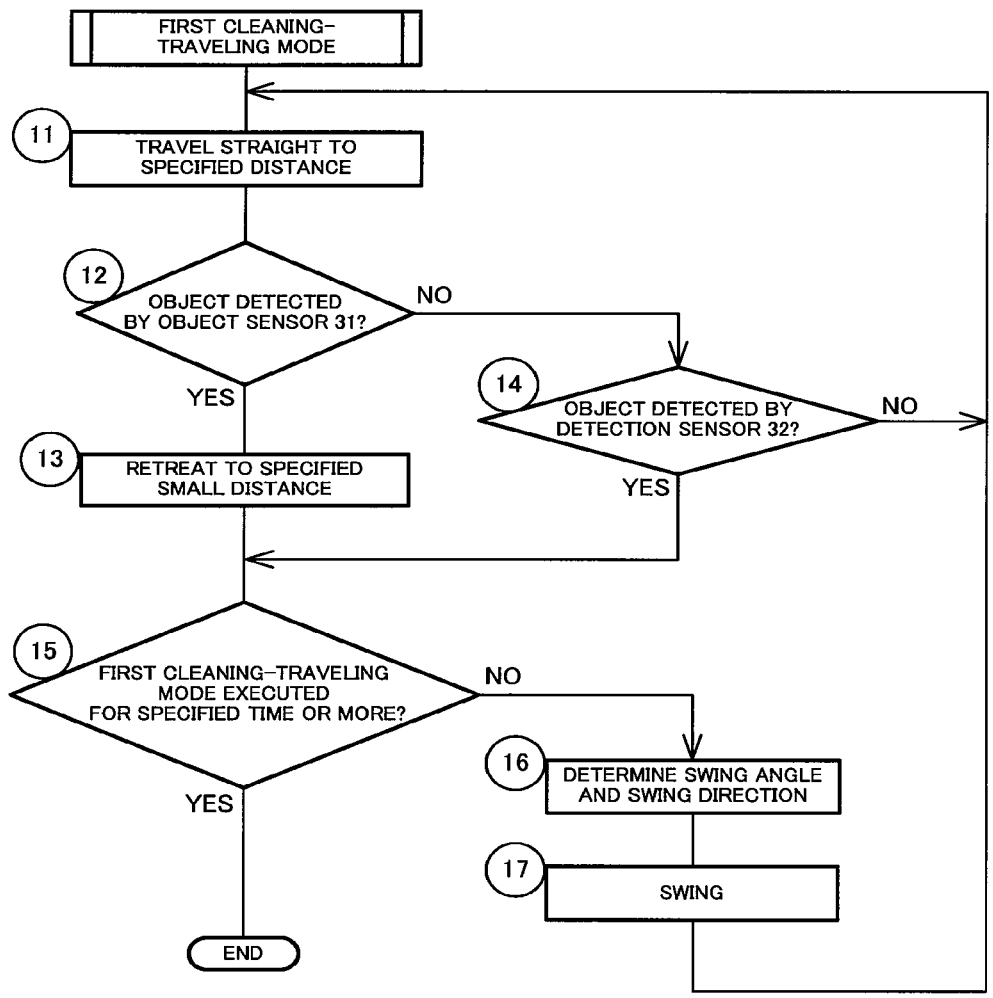
FIG. 13 is a flowchart showing processing of the first cleaning-traveling mode of the vacuum cleaner.

With reference also to the flowchart shown in FIG. 13, during the first cleaning-traveling mode, the control unit 20 controls operation of the motors 26, 26 (driving wheels 25, 25) to make the vacuum cleaner 11 (main casing 15) go straight to a specified distance (step 11). Next, the control unit 20 decides whether or not an object has been detected within a specified distance by the object sensor 31 (contact with the vacuum cleaner 11 (main casing 15 (bumper 35)) has been detected) (step 12). If it is decided at this step 12 that an object has been detected by the object sensor 31 (the main casing 15 (bumper 35) has come into contact (collision) with an object), then the control unit 20 controls operation of the motors 26, 26 (driving wheels 25, 25) so that the vacuum cleaner 11 (main casing 15) is retreated to a specified small distance (step 13), where the process moves to later-described step 15. This retreat is intended to prevent the main casing 15 (bumper 35) from rubbing against the object during later-described swing motion because the object sensor 31 is a contact sensor, and therefore the retreat has only to be such that the main casing 15 (bumper 35) can be made slightly apart from the object. Meanwhile, if it is decided at step 12 that an object has not been detected by the object sensor (the main casing 15 (bumper 35) has not come into contact (collision) with an object), the control unit 20 decides whether or not an object has been detected within a specified distance by the detection sensors 32 (step 14). If it is decided at this step 14 that an object has not been detected by the detection sensors 32, the process returns to step 11. If it is decided at step 14 that an object has been detected by the detection sensors 32, the process moves to step 15.

At step 15, the control unit 20 decides whether or not the first cleaning-traveling mode has been executed for a specified time. If it is decided at step 15 that the first cleaning-traveling mode has been executed for the specified time or more, the control unit 20 ends the first cleaning-traveling mode, moving to another cleaning-traveling mode. If it is decided at step 15 that the first cleaning-traveling mode has not been executed for the specified time or more (has been executed for less than the specified time), the control unit 20 determines a swing angle and a swing direction for the vacuum cleaner 11 (main casing 15) (step 16).

Figure 2:
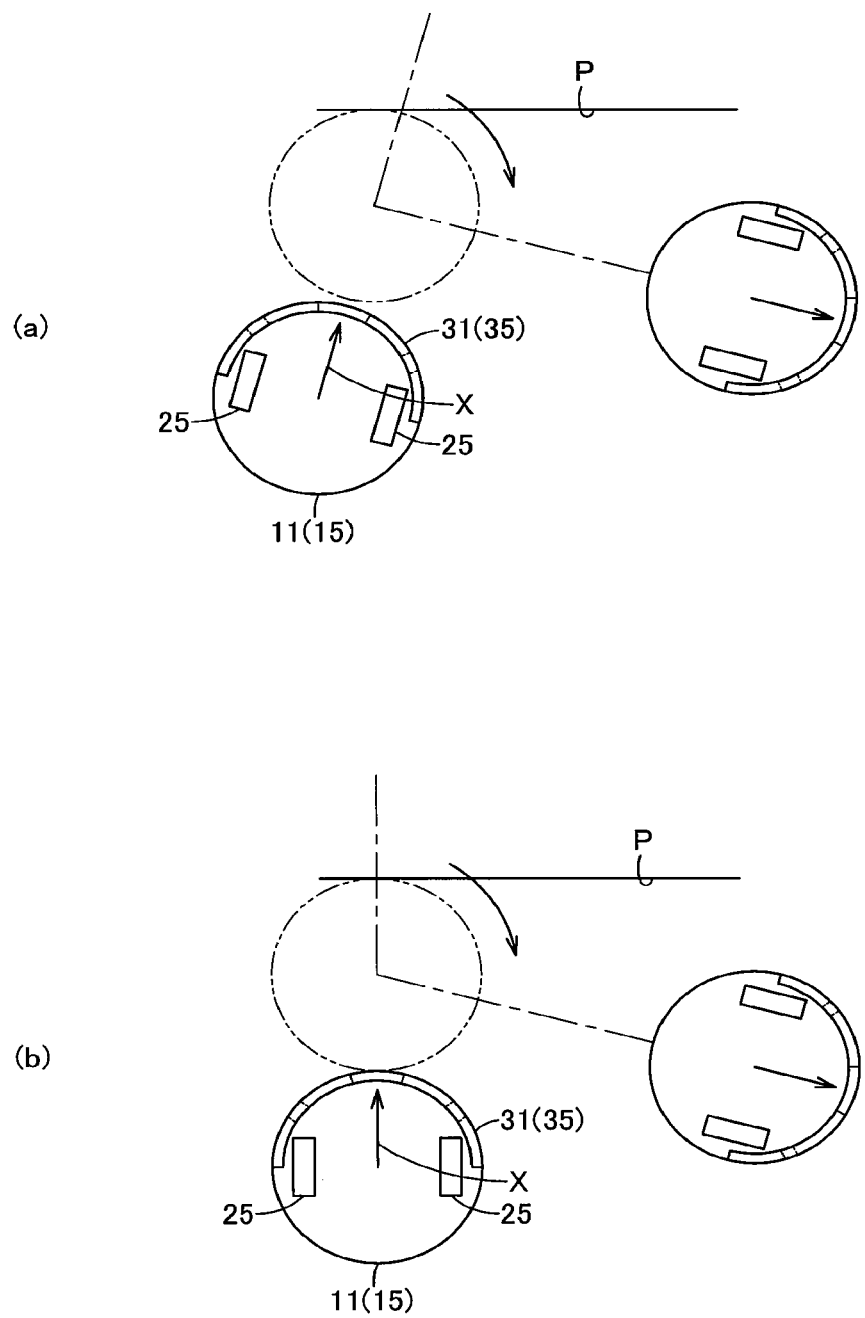
FIG. 2(a) is an explanatory view schematically showing an example of operation upon detection of an object by an object detection means in a first cleaning-traveling mode of the vacuum cleaner.
FIG. 2(b) is an explanatory view schematically showing another example of operation upon detection of an object by the object detection means in the first cleaning-traveling mode of the vacuum cleaner.

In this case, if an object has been detected by the object sensor 31 (if step 12 and step 13 have passed), the swing angle is determined by adding a random number of a specified angular range to a least swing angle which is calculated by adding a specified clearance angle to 90° and moreover, adding or subtracting a left/right direction simultaneous reaction angular range of the object sensor 31 thereto. More specifically, in this embodiment, the clearance angle is set to 5° as an example, the simultaneous reaction angular range is set to 15°, as an example, which is a left-and-right angle of the front-side region 31a, and the specified angular range is set to 0° to 30° as an example. Then, when the right-side region 31b or the left-side region 31c of the object sensor 31 has detected an object (e.g., FIG. 2(a) shows a case where the left-side region 31c has detected an object), the simultaneous reaction angular range is subtracted so that the swing direction is set to such a direction as to cause separation from the object, i.e., set to the counterclockwise (leftward) direction for detection of an object by the right-side region 31b and set to the clockwise direction (rightward) direction for detection of an object by the left-side region 31c. Also, when an object has been detected by the front-side region 31a of the object sensor 31 (e.g., shown in FIG. 2(b)), the simultaneous reaction angular range is added and moreover, the swing direction is determined as the clockwise direction or the counterclockwise direction by a random number. As a result, the possibility that the vacuum cleaner 11 (main casing 15), when going straight with its direction changed at a position near the object, may detect the same object once again (may come into contact again (collision again) with the same object, i.e., hitting twice) is securely prevented.

Figure 3:
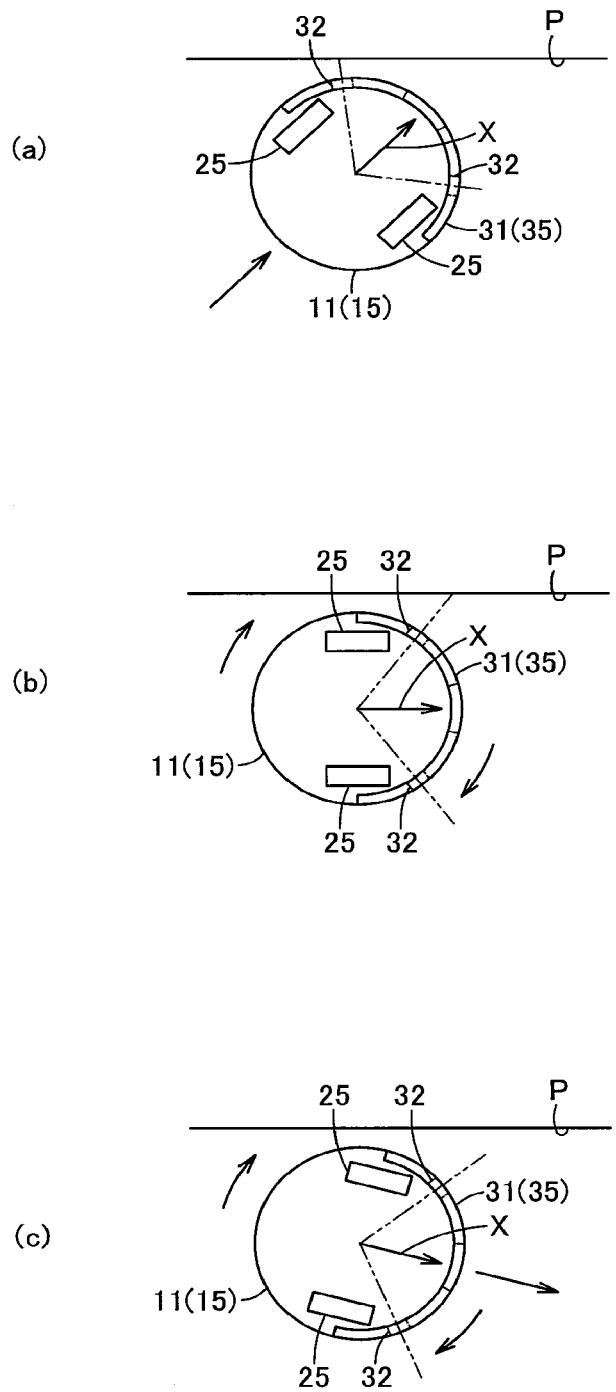
FIG. 3 is an explanatory view schematically showing, in an order of (a) to (c), an example of operation upon detection of an object by a detection means in the first cleaning-traveling mode of the vacuum cleaner.

Also, when an object has not been detected by the object sensor 31 (the bumper 35 has not come into contact with an object) but an object has been detected by the detection sensors 32 (when step 14 has passed) (FIG. 3(a)), the swing angle and the swing direction are set (FIG. 3(b)) in order that the vacuum cleaner 11 (main casing 15) is made parallel to the object, i.e., one of the detection sensors 32 on the side on which an object was detected is made to face the object, in other words, the forward direction of the vacuum cleaner 11 (main casing 15) is directed so as to be a direction parallel to the object, and furthermore, an additional swing angle is set (FIG. 3(c)). This additional swing angle is set by, for example, adding a random number within a specified angular range to the least clearance angle. As a result, a randomness is imparted to the swing angle and the above-mentioned possibility of twice hitting is prevented.

Preferably, the swing angle is so set that a separation angle from the object becomes an acute angle, by which mobility is ensured in the first cleaning-traveling mode and moreover, the control unit 20 is enabled to estimate the size of the region that is being cleaned based on a maximum straight-traveling distance.

Then, the vacuum cleaner 11 (main casing 15) is swung to the swing angle and the swing direction determined at step 16 (step 17), the process returning to step 11.

Figure 14:
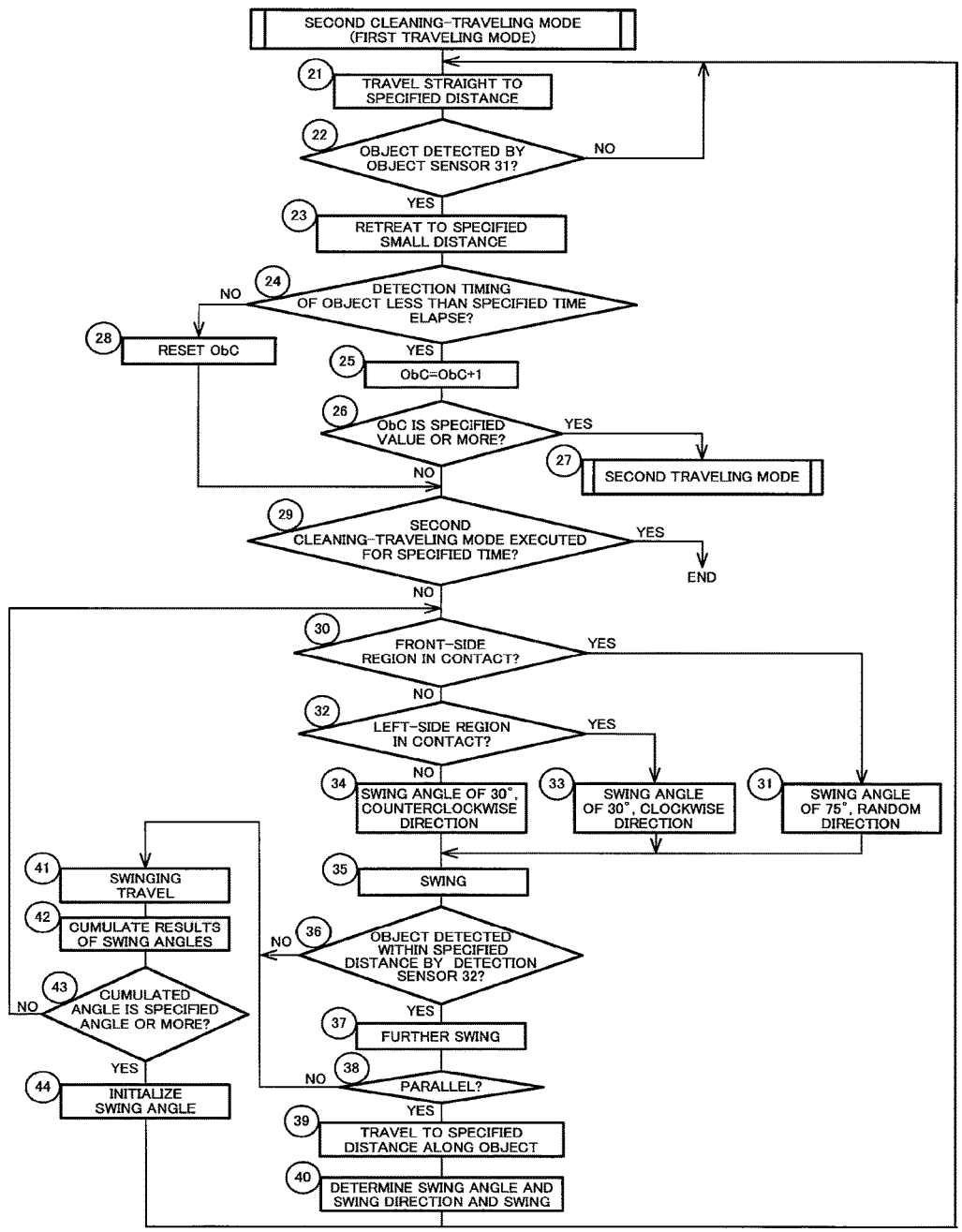
FIG. 14 is a flowchart showing processing of the second cleaning-traveling mode of the vacuum cleaner.

Next, with reference also to the flowchart shown in FIG. 14, in the second cleaning-traveling mode, the control unit 20 first makes the vacuum cleaner 11 (main casing 15) travel in the first traveling mode to a specified distance. That is, the control unit 20 controls operation of the motors 26, 26 (driving wheels 25, 25) so that the vacuum cleaner 11 (main casing 15) travels straight to a specified distance (step 21). Next, the control unit 20 decides whether or not an object P has been detected within a specified distance by the object sensor 31 (contact with the vacuum cleaner 11 (main casing 15 (bumper 35)) has been detected) (step 22). If it is decided at this step 22 that an object P has been detected by the object sensor 31 (the main casing 15 (bumper 35) has come into contact (collision) with the object P) (e.g., FIG. 1(a)), the control unit 20 controls operation of the motors 26, 26 (driving wheels 25, 25) so that the vacuum cleaner 11 (main casing 15) is retreated to a specified small distance (step 23, FIG. 1(b)), where the process moves to later-described step 24. This retreat is similar in purpose to that of the foregoing step 13. Meanwhile, if it is decided at step 22 that an object P has not been detected by the object sensor 31 (the main casing 15 (bumper 35) has not come into contact (collision) with the object P), the process returns to step 21.

At step 24, the control unit 20 stores a detection timing of the object P and moreover, decides whether or not an elapsed time from the preceding detection timing to this detection timing of the object P is less than a specified time, e.g. 4000 ms. Then, if it is decided at step 24 that the specified time is less than a specified time, the control unit 20 increments an object detection counter ObC by 1 (step 25), where it is decided whether or not the object detection counter ObC has come to a specified value (e.g., 5) or more (step 26). Then, if it is decided that the object detection counter ObC has come to a specified value or more, the object detection counter ObC is reset to 0, where the mode is switched over to the second traveling mode (step 27). Meanwhile, if it is decided at step 26 that the object detection counter ObC has not come to the specified value (less than the specified value), then the process moves to later-described step 29. That is, at steps 24 to 27, the control unit 20 exerts such control that it is decided whether or not detection of an object P within a specified time by the object sensor 31 has succeeded to a specified consecutive number of times or more, where if it is decided that the detection of the object P within a specified time by the object sensor 31 has succeeded to a specified consecutive number of times or more, then it is decided that the vacuum cleaner 11 (main casing 15) has entered a narrow spot, followed by change-over to the second traveling mode.

Meanwhile, if it is decided at step 24 that the elapsed time from the preceding detection timing to this detection timing of the object P is not less than a specified time, eg. 4000 ms (i.e., is equal to or more than 4000 ms), then the object detection counter ObC is reset (step 28), where the process moves to step 29.

At step 29, the control unit 20 decides whether or not the second cleaning-traveling mode has been executed for a specified time. If it is decided at step 29 that the second cleaning-traveling mode has been executed for a specified time or more, the control unit 20 ends the second cleaning-traveling mode, moving to another cleaning-traveling mode. Also, if it is decided at step 29 that the second cleaning-traveling mode has not been executed for a specified time or more (has been executed for less than a specified time), then the control unit 20 determines the swing angle and the swing direction for the vacuum cleaner 11 (main casing 15) by the process of the following steps 30 to 34.

First, the control unit 20 decides in which region the object P has been detected by the object sensor 31 at step 22, i.e., at which angle the vacuum cleaner 11 (main casing 15 (bumper 35)) has come into contact (collision) with the object P. For example, the control unit 20 decides whether or not the front-side region 31a has come into contact with the object P (step 30). If it is decided at step 30 that the front-side region 31a has come into contact with the object P, the control unit 20 sets the swing angle to, e.g., 75° (an angular range of the right-side region 31b and the left-side region 31c) and moreover, sets the swing direction randomly to the clockwise direction or the counterclockwise direction (step 31), where the process moves to subsequent step 35. Also, if it is decided at step 30 that the front-side region 31a has not come into contact with the object P, the control unit 20 decides whether or not the left-side region 31c has come into contact with the object P (step 32). Then, if it is decided at step 32 that the left-side region 31c has come into contact with the object P (FIG. 1(a)), the control unit 20 sets the swing angle to, e.g., 30° (an angular range of the front-side region 31a) and moreover, sets the swing direction to the clockwise (rightward) direction (step 33), where the process moves to subsequent step 35. Further, if it is decided at step that the left-side region 31c has not come into contact with the object P, the control unit 20 decides that the right-side region 31b has come into contact with the object P, setting the swing angle to, e.g., 30° (an angular range of the front-side region 31a) and moreover, sets the swing direction to the counterclockwise (leftward) direction (step 34), where the control unit 20 further controls operation of the motors 26, 26 (driving wheels 25, 25) so that the vacuum cleaner 11 (main casing 15) is swung to the swing angle and the swing direction decided at these steps 30 to 34 (step 35, FIG. 1(c)). That is, the control unit 20 sets the swing angle and the swing direction in such a manner that the vacuum cleaner (main casing 15) is swung (spin turn) to an angle set in correspondence to the angular range (angular range of each region 31a, 31b, 31c) of the direction of the object P detected by the object sensor 31 to thereby make a side portion of the vacuum cleaner 11 (main casing 15) face the object P.

Next, the control unit 20 decides whether or not a detection sensor 32 located on the object P side has detected the object P within a specified near distance of, e.g., 50 mm or less (step 36). If it is decided at this step 36 that the detection sensor 32 has not detected the object P within a specified near distance, it is decided that the object P is less likely to be a longitudinally continued object such as a wall, where the process moves to later-described step 41. Also, if it is decided that the detection sensor 32 has detected the object P within a specified near distance, the process moves to subsequent step 37.

That is, at the time point of swinging at step 35, the vacuum cleaner 11 (main casing 15) has not come to a state of having its side portion fully facing the object P (a state of being parallel to the object P). Therefore, in this state, the control unit 20 controls operation of the motors 26, 26 (driving wheels 25, 25) so that the vacuum cleaner 11 (main casing 15) is further swung (step 37, FIG. 1(d)), where it is decided whether or not the object P has been detected within a specified distance by the detection sensors 32 while the vacuum cleaner 11 (main casing 15) swings to an angle between a preset minimum swing angle and maximum swing angle, i.e., whether or not the front side of the vacuum cleaner 11 (main casing 15) has become generally parallel to the object P (step 38). Here, the minimum swing angle refers to an angle for nullifying the detection of the object P (detection of the distance to the object P) by the detection sensors 32 while the vacuum cleaner 11 (main casing 15) is swinging from the state of step 35 to the minimum swing angle, and the maximum swing angle refers to an angle serving as an upper limit for preventing the vacuum cleaner 11 (main casing 15) from swinging any more. In this embodiment, the minimum swing angle is set to, e.g., 0° and the maximum swing angle is set to, e.g., 30°.

Then, if it is decided at step 38 that the object P has been detected within a specified distance by the detection sensors 32 during the swing of an angle between the minimum swing angle and the maximum swing angle, the control unit 20 decides that a side portion of the vacuum cleaner 11 (main casing 15) has become along (succeeded in being parallelized to) an object P1 such as a longitudinally continued wall or the like as shown in FIG. 1(e); in other words, that the object P1 is a continued wall-like shaped object, so that the vacuum cleaner 11 (main casing 15) is traveled to a specified distance along the object P1 (along-the-wall traveling, step 39). In this traveling of step 39, the control unit controls operation of the motors 26, 26 (driving wheels 25, 25) so that the vacuum cleaner 11 (main casing 15) travels to a specified distance, e.g. 350 mm, while the distance to the object P1 is kept at a specified value, e.g. 10 mm, by the detection sensors 32 (FIG. 1(f)).

Thereafter, the control unit 20 determines the swing angle and the swing direction for the vacuum cleaner 11 (main casing 15) depending on a result of detecting a vicinal object by the object sensor 31 and the detection sensors 32 as well as a random number. Then, the control unit 20 controls operation of the motors 26, 26 (driving wheels 25, 25) so that the vacuum cleaner 11 (main casing 15) is swung in such a direction as to be separated from the object P1 (step 40), returning to step 21.

Meanwhile, if it is decided at step 38 that the object P has not been detected within a specified distance by the detection sensors 32 during a swing of an angle between the minimum swing angle and the maximum swing angle, the control unit 20 decides that the vacuum cleaner 11 (main casing 15) is trying to make its side portion face an object P2 that can be turned around (bypassed) such as a non-continued leg of furniture and the like as shown in FIG. 1(g), i.e., decides that the object P2 is not a wall-like shaped object, where the control unit 20 makes the vacuum cleaner 11 (main casing 15) travel straight to a specified distance along the object P2 and moreover swingingly travel so as to turn around the object P2 (narrow-spot entry traveling, step 41). In the swinging travel of this step 41, the swing radius is set to a sum of the radius of the main casing 15 plus a specified value (e.g., 10 mm) and the swing angle is set to 90°, and moreover the control unit 20 controls operation of the motors 26, 26 (driving wheels 25, 25) so that the vacuum cleaner 11 (main casing 15) swingingly travels in a swing direction opposite to the swing direction of step 35 (FIG. 1(h)). In addition, when the object sensor 31 has detected contact with an object in the above swinging travel, the control unit 20 stops the swinging at the time point of detection and controls operation of the motors 26, 26 (driving wheels 25, 25) so that the vacuum cleaner 11 (main casing 15) is retreated to a specified small distance. This retreat is similar in purpose to that of the foregoing step 13.

Next, the control unit 20 cumulatively sums up results of swinging-travel angles of step 41 (step 42) and decides whether or not the cumulated angle has come to a specified angle, e.g., 90° or more (step 43). Then, if it is decided at this step 43 that the cumulated angle is not a specified angle (90°) or more (is less than the specified angle), the process returns to step 30. Also, if it is decided at step 43 that the cumulated angle is a specified angle (90°) or more, then the cumulated angle is initialized to 0° (step 44), where the process returns to step 21. That is, in this embodiment, it is decided that when a 90° or more swinging travel can be achieved, the vacuum cleaner 11 (main casing 15) has been able to go on a round-about way so as to turn around the object P2.

Figure 4:
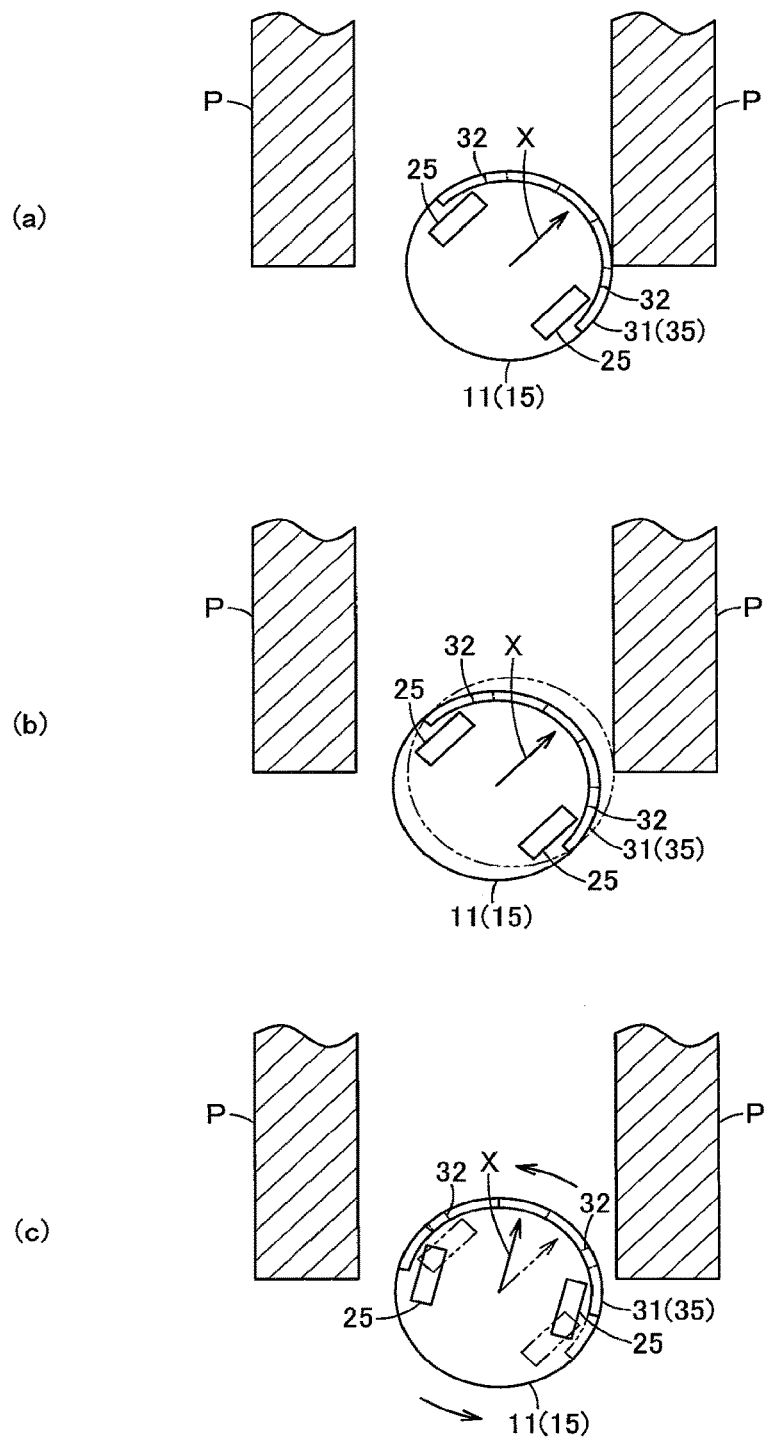
FIG. 4 is an explanatory view schematically showing, in an order of (a) to (c), an example of operation in a second traveling mode of the second cleaning-traveling mode of the vacuum cleaner.
Figure 11:
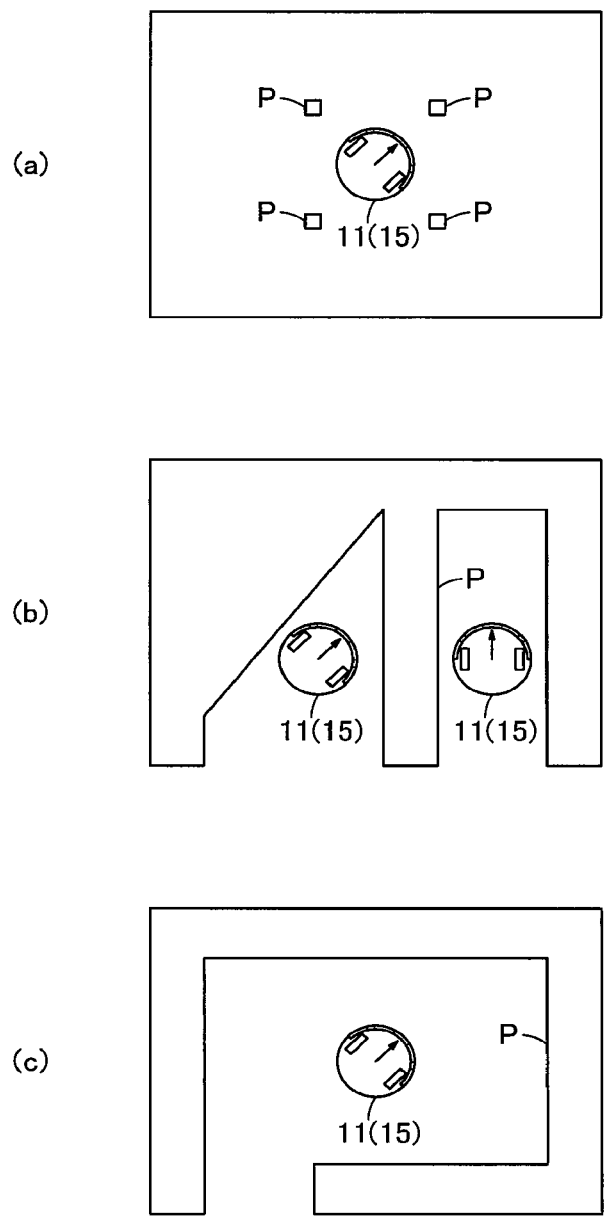
FIG. 11 is an explanatory view schematically showing, in (a) to (c), an example of narrow spots which the vacuum cleaner enters.
Figure 15:
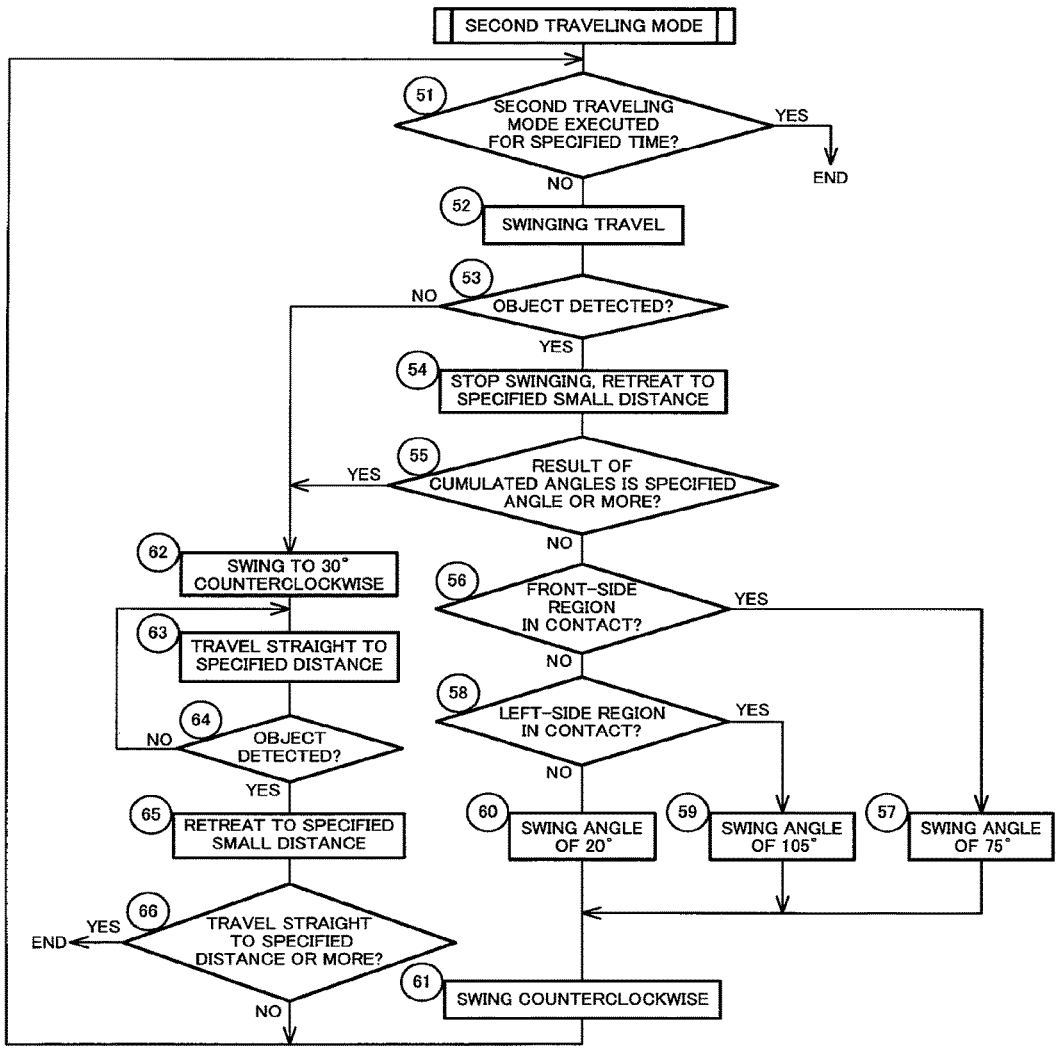
FIG. 15 is a flowchart showing processing of the second traveling mode of the vacuum cleaner.

Also, the second traveling mode is used for escape from occurrences that the vacuum cleaner 11 (main casing 15) has entered such spots as a spot between a plurality of objects P spaced from one another such as legs of furniture or the like as shown in FIG. 11(a) for example, narrow-width dead ends surrounded in three directions by an object P such as a wall or the like as shown in FIG. 11(h), or narrow regions surrounded by an object P such as a wall or the like as shown in FIG. 11(c). This second traveling mode can be envisaged in two cases: the so-called along-the-right-hand case in which the right side of the vacuum cleaner 11 (main casing 15) faces the object P and the along-the-left-hand case in which the motion is reversed in left and right. Although using at least either one of those cases or switching between these cases depending on specified conditions is permissible, the along-the-right-hand case is taken as an example below for a clearer explanation. With reference also to the flowchart shown in FIG. 15, in the second traveling mode, the control unit 20 first decides whether or not the second traveling mode has been executed for a specified time, e.g. 20 sec. (step 51). If it is decided at this step 51 that the second traveling mode has been executed for a specified time or more, the control unit ends the second traveling mode, moving to the first traveling mode or another cleaning-traveling mode. Also, if it is decided at step 51 that the second traveling mode has not been executed for a specified time or more (has been executed for less than the specified time), then the control unit 20 makes the vacuum cleaner 11 (main casing 15) swingingly travel so as to go on a round-about way around the object P (step 52). For the swinging travel in this step 52, the swing radius is set to a sum of the radius of the main casing 15 plus a specified value (e.g., 10 mm) and the swing angle is set to 360°, and moreover the control unit 20 controls operation of the motors 26, 26 (driving wheels 25, 25) so as to make the swinging travel executed to a swing direction of the clockwise (rightward) direction (FIG. 4(a)). Then, the control unit 20 decides whether or not the object P has been detected by the object sensor 31, i.e., whether or not the vacuum cleaner 11 (main casing (bumper 35)) has come into contact (collision) with the object P (step 53). If it is decided at step 53 that the object P has been detected by the object sensor 31 (FIG. 4(b)), the control unit 20 stops the swinging at the time point of detection and controls operation of the motors 26, 26 (driving wheels 25, 25) so that the vacuum cleaner 11 (main casing 15) is retreated to a specified small distance (step 54), where the process moves to step 55. This retreat is similar in purpose to that of the foregoing step 13.

The control unit 20 decides whether or not the cumulative result of swinging travel angles in step 52 has come to a specified angle, e.g. 100°, or more (step 55). Then, if it is decided at this step 55 that the cumulative result of angles is not a specified angle (100°) or more (is less than the specified angle), then the control unit 20 determines the swing angle of the vacuum cleaner 11 (main casing 15) depending on the processing of following steps 56 to 60.

First, the control unit 20 decides in which region the object sensor 31 has detected the object P, i.e. at which angle the vacuum cleaner 11 (main casing 15 (bumper 35)) has come into contact (collision) with the object, at the time point of stoppage of the swinging travel of step 52. For example, the control unit 20 decides whether or not the front-side region 31a has come into contact with the object P (step 56). If it is decided at this step 56 that the front-side region 31a has come into contact with the object P, the control unit 20 sets the swing angle to, e.g., 75° (an angular range of the right-side region 31b and the left-side region 31c) (step 57), moving to subsequent step 61. Also, if it is decided at this step 56 that the front-side region 31a has not come into contact with the object P, the control unit 20 decides whether or not the left-side region 31c has come into contact with the object P (step 58). If it is decided at step 58 that the left-side region 31c has come into contact with the object P, the control unit 20 sets the swing angle to, e.g., 105° (an angular range of the front-side region 31a) (step 59), moving to subsequent step 61. Further, if it is decided at step 58 that the left-side region 31c has not come into contact with the object P, the control unit 20 decides that the right-side region 31b has come into contact with the object P, and sets the swing angle to, e.g., 20° (an angular range of the front-side region 31a) (step 60) and controls operation of the motors 26, 26 (driving wheels 25, 25) so that the vacuum cleaner 11 (main casing 15) swings in the clockwise (leftward) direction at the swing angle determined in these steps 56 to 60 (step 61). That is, with respect to the object P detected by the object sensor 31, the control unit 20 controls operation of the motors 26, 26 (driving wheels 25, 25) so that the vacuum cleaner 11 (main casing 15) is swung to an angle corresponding to the direction of the object P, i.e., sets a swing angle in correspondence to each positional relationship between the vacuum cleaner 11 (main casing 15) and the object P, thereby causing a side portion of the vacuum cleaner 11 (main casing 15) to face the object P. Therefore, by this second traveling mode, the vacuum cleaner 11 (main casing 15) is controlled by the control unit 20 so as to travel in a curved shape (circular-arc shape) along the object P detected by the object sensor (FIG. 4(c)).

Figure 5:
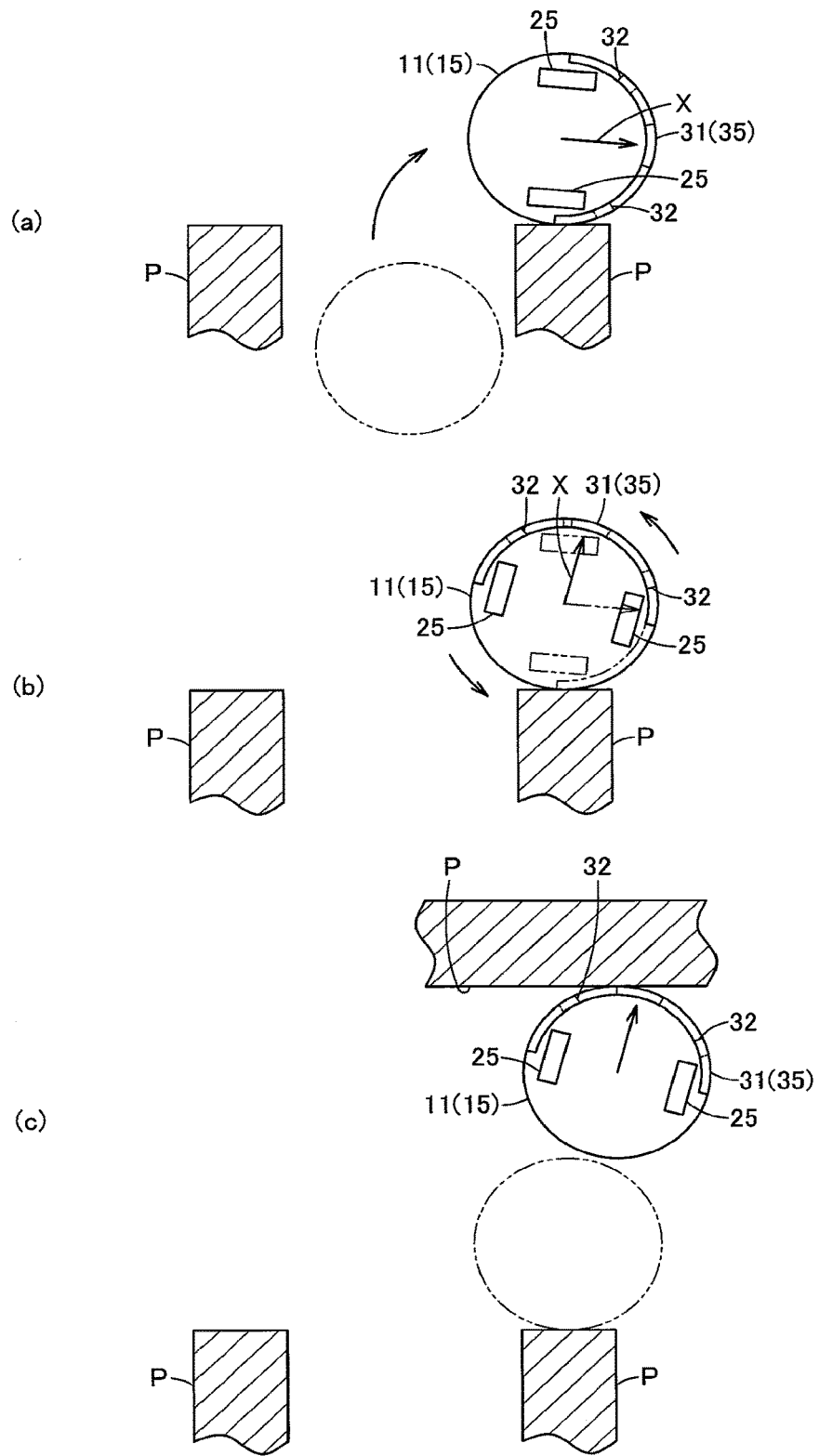
FIG. 5 is an explanatory view schematically showing, in an order of (a) to (c), an example of operation upon ending the second traveling mode of the second cleaning-traveling mode of the vacuum cleaner.
Figure 6:
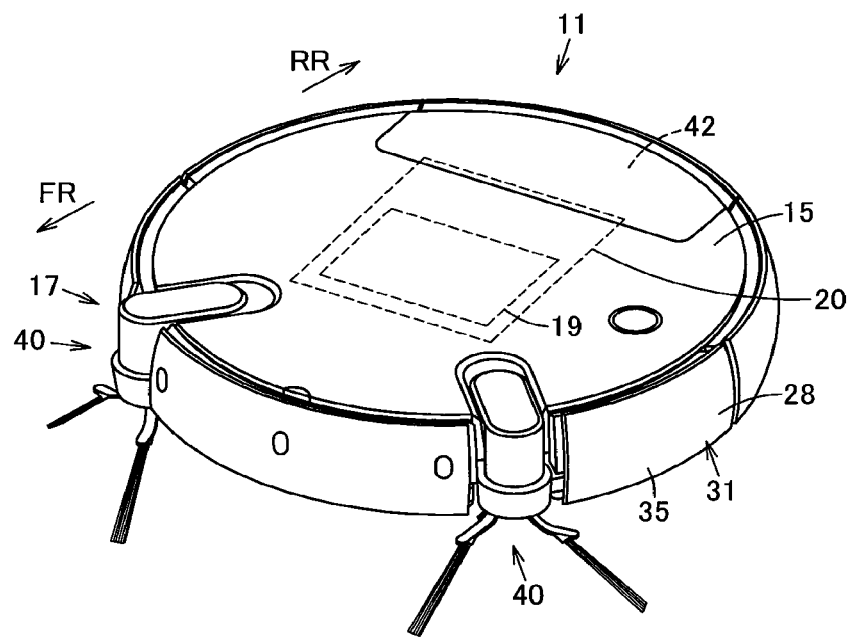
FIG. 6 is a perspective view of the vacuum cleaner.
Figure 7:
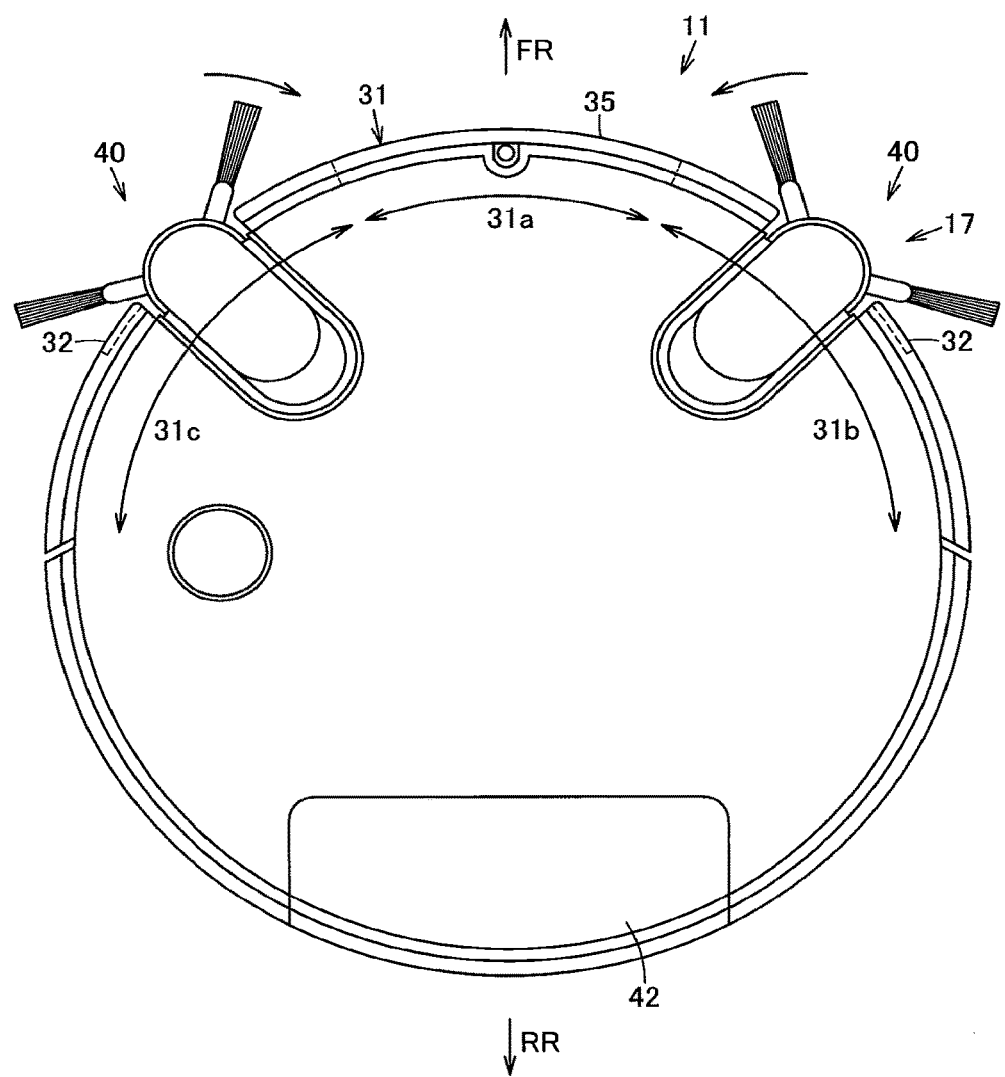
FIG. 7 is a plan view showing the vacuum cleaner as viewed from above.
Figure 8:
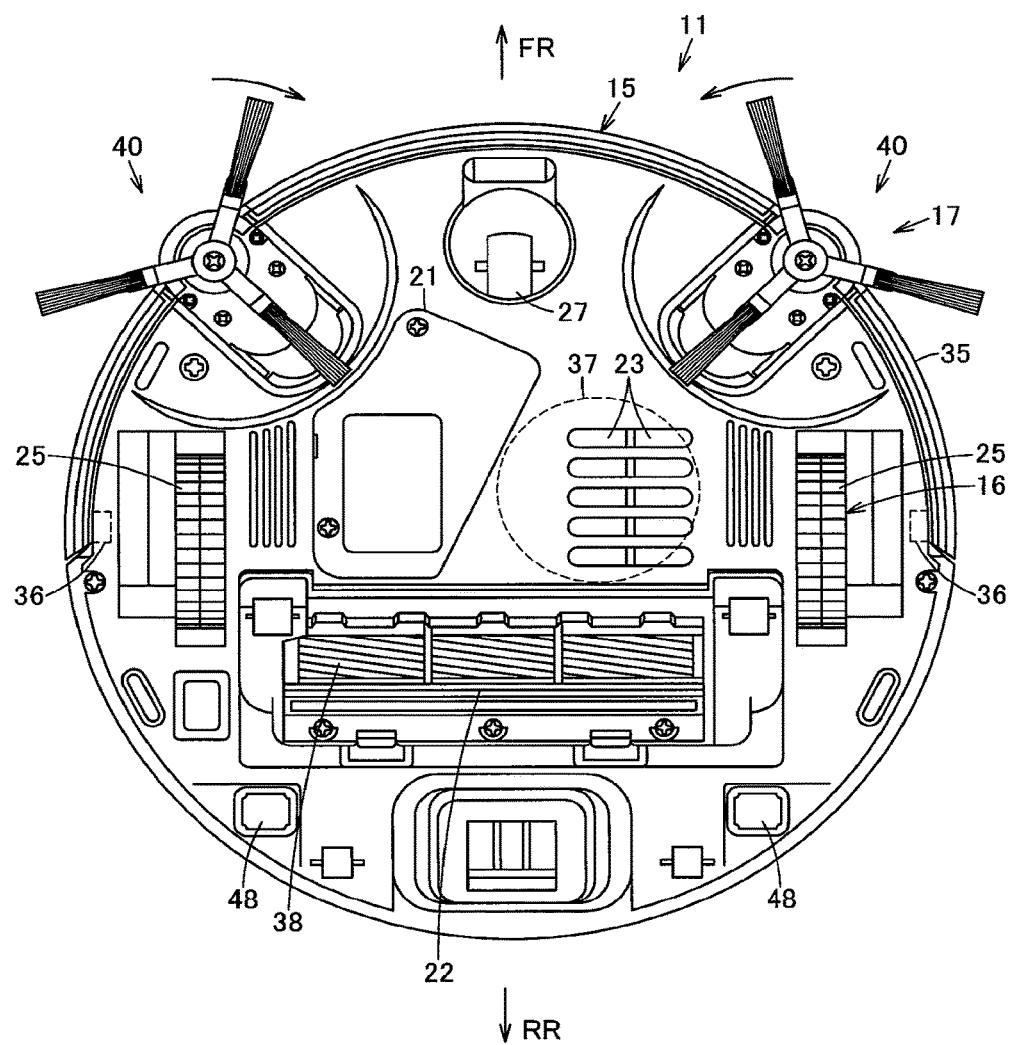
FIG. 8 is a plan view showing the vacuum cleaner as viewed from below.
Figure 9:
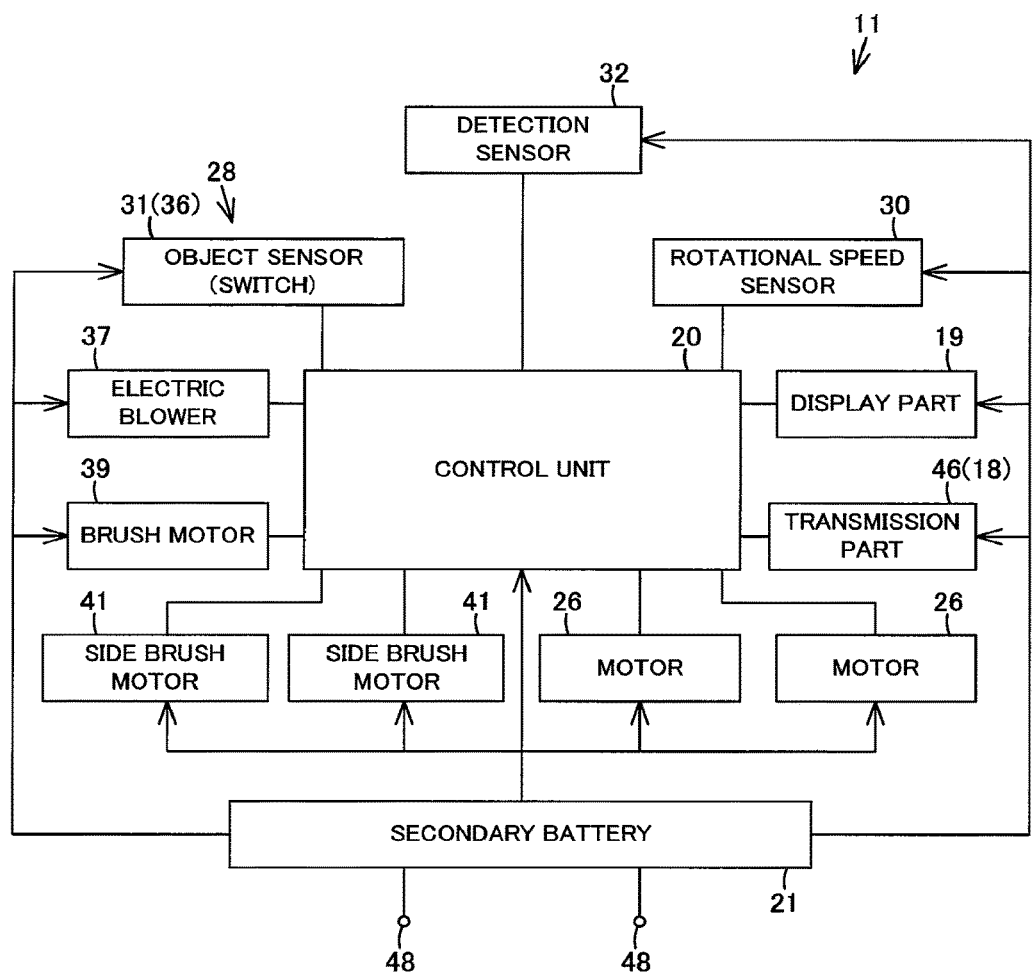
FIG. 9 is a block diagram showing an internal structure of the vacuum cleaner.

Meanwhile, if it is decided at step 55 that the cumulative result of the angles is a specified angle (100°) or more and if it is decided at step 53 that the object P has not been detected by the object sensor 31, it follows that a swing of 360°, which is a swing angle set by the swinging travel of step 52, has been executed, and therefore the control unit 20 controls operation of the motors 26, 26 (driving wheels 25, 25) so that the vacuum cleaner 11 (main casing 15) is swung to a specified angle, e.g., 30° (spin turn) (step 62, FIG. 5(a)) and furthermore the vacuum cleaner 11 (main casing 15) is traveled straight to a specified distance (step 63, FIG. 5(h)).

Then, the control unit 20 decides whether or not the object P has been detected by the object sensor 31 (step 64). If it is decided at this step 64 that the object has not been detected by the object sensor 31, then the process returns to step 63. Also, if it is decided at this step 64 that the object P has been detected by the object sensor 31, then the control unit controls operation of the motors 26, 26 (driving wheels 25, 25) so that the vacuum cleaner 11 (main casing 15) is retreated to a specified small distance (step 65). This retreat is similar in purpose to that of the foregoing step 13. Then, the control unit 20 decides whether or not the vacuum cleaner 11 (main casing 15) has traveled straight to a specified distance, e.g. 500 mm, or more (step 66). If it is decided at step 66 that the vacuum cleaner 11 (main casing 15) has traveled straight to a specified distance or more, it is decided that the vacuum cleaner 11 (main casing 15) has succeeded in escaping from a narrow spot, where the second traveling mode is ended and the process is moved to the first traveling mode or another cleaning-traveling mode. Further, if it is decided at step 66 that the vacuum cleaner 11 (main casing 15) has not traveled straight to a specified distance or more (has traveled straight to less than the specified distance), the process returns to step 51. In addition, in the along-the-left-hand case of the second traveling mode, the swing direction of step 52, step 61 and step 62 is the counterclockwise (leftward) direction and the decision at step 58 is made as to the right-side region 31b, the rest being the same.

Further, in the third cleaning-traveling mode, the control unit 20 controls operation of the motors 26, 26 (driving wheels 25, 25) so that the vacuum cleaner 11 (main casing 15) is traveled straight along an object located at an outer edge of the cleaning region such as a wall. In this case, the control unit 20 exerts such control that a distance to the object located sideward of the vacuum cleaner 11 (main casing 15) is kept at a specified distance, e.g. 10 mm, by the detection sensors 32. Then, if the object has been detected within a specified distance by the object sensor 31 (contact with the vacuum cleaner 11 (main casing 15 (bumper 35)) has been detected), then the control unit 20 controls operation of the motors 26, 26 (driving wheels 25, 25) so that the vacuum cleaner 11 (main casing 15) is swung (spin turn) and further traveled straight with its front side generally parallel to the object. Furthermore, if the third cleaning-traveling mode is executed for a specified time, the mode is switched over to another cleaning-traveling mode.

Use of the first cleaning-traveling mode to third cleaning-traveling mode makes it possible to clean the whole floor surface in the region generally without gaps.

In this embodiment, the second traveling mode of the second cleaning-traveling mode to be used for escape from entries into narrow spots is used only in the second cleaning-traveling mode. However, also in the first cleaning-traveling mode and the third cleaning-traveling mode, incorporating the same decision and control as the decision conditions for movement from the first traveling mode to the second traveling mode in the second cleaning-traveling mode and executing the same traveling mode as in the second traveling mode of the second cleaning-traveling mode allows the vacuum cleaner 11 (main casing 15) to escape from narrow spots in a short amount of time, so that loss of the cleaning time due to residing at narrow spots can be reduced.

(Charging Work)

After docking of the vacuum cleaner 11 with the charging device, for example, when a specified timing, e.g. a previously set charging start time, has come or when a specified time has elapsed since docking of the vacuum cleaner 11 with the charging device, the control unit 20 moves to the charging mode, starting the charging from the charging device of the secondary battery 21. Then, if it is decided that the voltage of the secondary battery 21 has increased to a specified operable voltage, then the charging work is ended, where the control unit 20 moves to the standby mode.

According to the one embodiment described hereinabove, in the first traveling mode or the second traveling mode, when an object is detected by the object sensor 31, the control unit 20 controls operation of the motors 26, 26 (driving wheels 25, 25) so that the vacuum cleaner 11 (main casing 15) is swung to an angle corresponding to the direction of the detected object, more specifically, to an angle set in correspondence to an angular range (angular range of each region 31a, 31b, 31c) in a plurality of directions on the forward side of the vacuum cleaner 11 (main casing 15) detected by the object sensor 31 to thereby cause a side portion of the vacuum cleaner 11 (main casing 15) to face the object. Thus, narrow spots can be cleaned with higher efficiency while objects are avoided effectively.

Specifically, when an object P2 is detected by the object sensor 31 in the first traveling mode, the control unit 20 controls operation of the motors 26, 26 (driving wheels 25, 25) so that the vacuum cleaner 11 (main casing 15) is swung to an angle corresponding to the direction of the detected object P2 to thereby cause a side portion of the vacuum cleaner 11 (main casing 15) to face the object P2. In this state, if the object P2 is not detected by the detection sensors 32 (FIG. 1(g)), then it is decided that the object P2 is an object that can be followed around on a round-about way (bypassed) such as a non-continued leg of furniture or the like, and the control unit 20 controls operation of the motors 26, 26 (driving wheels 25, 25) so that the vacuum cleaner 11 (main casing 15) is traveled straight to a specified distance and thereafter traveled so as to be swingingly traveled toward the object P2 detected by the object sensor 31 (FIG. 1(h)). Thus, by aggressively utilizing the detection by the object sensor 31 and the detection sensors 32, the vacuum cleaner 11 (main casing 15) can be made to effectively (with high probability) enter narrow spots where the object P2 is placed, making it possible to effectively clean floor surfaces of the narrow spots.

Also, when an object P1 is detected by the object sensor 31 in the first traveling mode, the control unit controls operation of the motors 26, 26 (driving wheels 25, 25) so that the vacuum cleaner 11 (main casing 15) is swung to an angle corresponding to the direction of the detected object P1 to thereby cause a side portion of the vacuum cleaner 11 (main casing 15) to face the object P1. In this state, if the object P1 is detected by the detection sensors 32 (FIG. 1(e)), then it is decided that the object P1 is a continued object such as a wall or the like, and the control unit 20 controls operation of the motors 26, 26 (driving wheels 25, 25) so that the vacuum cleaner 11 (main casing 15) is traveled straight along the object P1. Thus, floor surfaces near the object P1 such as a wall or the like can be cleaned effectively.

Further, in the first traveling mode in which the vacuum cleaner 11 (main casing 15) is made to travel straight and in which, when an object is detected by the object sensor 31, the control unit 20 controls operation of the motors 26, 26 (driving wheels 25, 25) so that a side portion of the vacuum cleaner 11 (main casing 15) faces the object, if detection of an object within a specified time by the object sensor 31 has occurred consecutively for a specified number of times or more, it is decided that the vacuum cleaner 11 (main casing 15) has entered a narrow spot that is hard to escape from, where the mode is switched over to the second traveling mode in which the control unit 20 controls operation of the motors 26, 26 (driving wheels 25, 25) so that the vacuum cleaner 11 (main casing 15) travels in a curved shape along the object detected by the object sensor 31. Thus, by aggressively utilizing the detection by the object sensor 31, the escapability from narrow spots can be further improved.

Then, when it is decided that the vacuum cleaner 11 (main casing 15) has been swung to a specified angle (100°) or more in the second traveling mode, the control unit 20 controls operation of the motors 26, 26 (driving wheels 25, 25) so that the vacuum cleaner 11 (main casing 15) is swung in the reverse direction and thereafter traveled straight. Thus, the vacuum cleaner 11 (main casing 15) can be prevented from re-entering a narrow spot from which the vacuum cleaner 11 (main casing 15), as it can be assumed, has escaped by swinging in the second traveling mode.

Therefore, during a sequence of motions for turning the directions relative to objects in the cleaning motion, the vacuum cleaner 11 decides shapes of objects with high probability based on detections by the object sensor 31 and the detection sensors 32, and performs travel control corresponding to those shapes of the objects. Thus, by aggressively utilizing the detection by these object sensor 31 and detection sensors 32, respectively, the vacuum cleaner 11 is enabled to smoothly bypass or go on a round-about way around objects and enter or escape from narrow spots without involving useless motions or complicated control, so that narrow spots can be cleaned (in a short time) effectively with high probability.

Since the object sensor 31 is provided as a contact sensor for detecting an object by contact with the object, an object and the distance between the object and the vacuum cleaner 11 (main casing 15 (bumper 35)) can each be detected with higher precision. Moreover, when an object is detected by the object sensor 31, the vacuum cleaner 11 (main casing 15 (bumper 35)) is once retreated so that the object sensor 31 (bumper 35) is separated from the object, by which, when the vacuum cleaner 11 (main casing 15) is swung to an angle corresponding to the direction of the detected object to thereby cause a side portion of the vacuum cleaner 11 (main casing 15) to face the object, the object sensor 31 (bumper 35) can be prevented from rubbing against the object. Thus, the object and the vacuum cleaner 11 (main casing 15 (bumper 35)) can be prevented from being damaged more securely.

In the above-described one embodiment, it is also allowable that a non-contact type distance measuring sensor such as ultrasonic sensor or infrared sensor, for example, is used as the object sensor 31, where objects located within a specified distance are detected without contact therewith.

The detection sensors 32 are placed in left-and-right symmetry. However, in a case where only either the along-the-right-hand mode or the along-the-left-hand mode is applied in the second traveling mode or the third cleaning-traveling mode, providing a detection sensor 32 only in the relevant direction allows the same functional effects as in the above embodiment to be produced.

Further, the cleaning motion may be started not only at the charging device but at any arbitrary position in the cleaning region as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

A travel control method for a vacuum cleaner for autonomously traveling a main casing of the vacuum cleaner based on detection of the presence or absence of an object within a specified distance in a plurality of directions on a forward side of the main casing by an object sensor, wherein when an object is detected within a specified distance in the plurality of directions on the forward side of the main casing, the main casing is swung to an angle corresponding to a direction of the detected object to thereby make a side portion of the main casing face the object.

The travel control method for a vacuum cleaner as described above, wherein when an object is detected within a specified distance of an angular range in the plurality of directions on the forward side of the main casing by the object sensor, the main casing is swung to an angle set in correspondence to an angular range of the direction of the detected object to thereby make a side portion of the main casing face the object.

The travel control method for a vacuum cleaner as described above, wherein when an object has come into contact with an object sensor in any one of the plurality of directions on the forward side of the main casing, the main casing is once retreated so as to be separated from the object and thereafter swung to an angle corresponding to a direction of the object to thereby make a side portion of the main casing face the object.

The travel control method for a vacuum cleaner as described above, wherein when an object is detected within a specified distance in the plurality of directions on the forward side of the main casing by the object sensor, operation of the driving wheels is controlled so that the main casing is swung to an angle corresponding to a direction of the detected object to thereby make a side portion of the main casing face the object, in which state, when no object is detected forward of the side portion of the main casing by the detection sensor, the main casing is traveled straight to a specified distance and thereafter swingingly traveled toward the object.

The travel control method for a vacuum cleaner as described above, wherein when an object is detected within a specified distance in the plurality of directions on the forward side of the main casing by the object sensor, operation of the driving wheels is controlled so that the main casing is swung to an angle corresponding to a direction of the detected object to thereby make a side portion of the main casing face the object, in which state, when an object is detected forward of the side portion of the main casing by the detection sensor, the main casing is traveled straight along the object.

The travel control method for a vacuum cleaner as described above, wherein the control method has a first traveling mode in which the main casing is traveled straight and moreover, when an object is detected within a specified distance in the plurality of directions on the forward side of the main casing by the object sensor, a side portion of the main casing is made to face the object, and a second traveling mode in which the main casing travels in a curved shape along the object detected within the specified distance in the plurality of directions on the forward side of the main casing by the object sensor, and wherein when detection of an object within the specified distance in the plurality of directions on the forward side of the main casing by the object sensor has occurred consecutively for a specified number of times or more within a specified time in the first traveling mode, the mode is switched over to the second traveling mode.

The travel control method for a vacuum cleaner as described above, wherein when the main casing is swung to a specified angle or more in the second traveling mode, the main casing is swung in a reverse direction and thereafter traveled straight.

The invention claimed is:

1. A vacuum cleaner comprising:
   a main casing;
   a driving wheel for enabling the main casing to travel on a cleaning-object surface;
   a cleaning unit for cleaning the cleaning-object surface;
   an object sensor provided in the main casing and serving for detecting presence or absence of an object within a specified distance located in an angular range in a plurality of different directions on a forward side of the main casing;
   a detection sensor provided in the main casing and serving for detecting presence or absence of an object within a specified distance in front of a side portion of the main casing; and
   a control unit for controlling operation of the driving wheels based on detection of an object by the object sensor and the detection sensor to thereby make the main casing autonomously travel, wherein
   when an object is detected by the object sensor, the control unit controls the operation of the driving wheels so that the main casing is swung to an angle set in correspondence to an angular range of a direction of the detected object, and when the object is detected by the detection sensor, the control unit controls the operation of the driving wheels so that the main casing is further swung, thereby making a side portion of the main casing face the object.

2. The vacuum cleaner according to claim 1, wherein
   the object sensor is a contact sensor for detecting an object by contact with the object, and
   when an object is detected by the object sensor, the control unit controls the operation of the driving wheels so that the main casing is once retreated to make the object sensor separated from the object and thereafter the main casing is swung to an angle set in correspondence to an angular range of a direction of the detected object.

3. The vacuum cleaner according to claim 1, wherein
   when the control unit controls the operation of the driving wheels so as to make a side portion of the main casing face the object, and when the object is not detected by the detection sensor, the control unit controls the operation of the driving wheels so that the main casing is traveled straight to a specified distance and thereafter swingingly traveled toward the object detected by the object sensor.

4. The vacuum cleaner according to claim 1, wherein
   the control unit controls the operation of the driving wheels so as to make a side portion of the main casing face the object, and when the object is detected by the detection sensor, the control unit controls the operation of the driving wheels so that the main casing is traveled straight along the object.

5. The vacuum cleaner according to claim 1, wherein
   the control unit has
   a first traveling mode in which the control unit controls the operation of the driving wheels so that the main casing is traveled straight and moreover, when an object is detected by the object sensor, a side portion of the main casing faces the object, and
   a second traveling mode in which the control unit controls the operation of the driving wheels so that the main casing travels in a curved shape along the object detected by the object sensor, and wherein when detection of an object by the object sensor within a specified time has occurred consecutively for a specified number of times or more in the first traveling mode, the mode is switched over to the second traveling mode.

6. The vacuum cleaner according to claim 5, wherein
   the control unit, when having decided that the main casing has swung to a specified angle or more in the second traveling mode, controls the operation of the driving wheels so that the main casing is swung in a reverse direction and thereafter traveled straight.

* * * * *